US012297361B2

(12) United States Patent
Sato et al.

(10) Patent No.: US 12,297,361 B2
(45) Date of Patent: May 13, 2025

(54) PARTICLE, AQUEOUS DISPERSION, INK JET INK, FILM-FORMING METHOD, AND IMAGE-FORMING METHOD

(71) Applicant: FUJIFILM CORPORATION, Tokyo (JP)

(72) Inventors: Noriaki Sato, Kanagawa (JP); Ryo Fujiwara, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 621 days.

(21) Appl. No.: 17/692,179

(22) Filed: Mar. 11, 2022

(65) Prior Publication Data

US 2022/0213336 A1    Jul. 7, 2022

Related U.S. Application Data

(63) Continuation of application No. PCT/JP2020/033690, filed on Sep. 4, 2020.

(30) Foreign Application Priority Data

Sep. 27, 2019   (JP) ................. 2019-177414

(51) Int. Cl.
| | | |
|---|---|---|
| C08F 2/46 | (2006.01) | |
| B41M 5/00 | (2006.01) | |
| C08F 2/50 | (2006.01) | |
| C08G 61/04 | (2006.01) | |
| C09D 11/101 | (2014.01) | |
| C09D 11/102 | (2014.01) | |
| C09D 11/30 | (2014.01) | |

(52) U.S. Cl.
CPC ......... *C09D 11/102* (2013.01); *B41M 5/0023* (2013.01); *C09D 11/101* (2013.01); *C09D 11/30* (2013.01)

(58) Field of Classification Search
CPC ..... C08F 2/48; C08F 2/50; C08F 2/44; B41M 5/0023; C09D 11/322; C09D 11/30; C09D 11/101; C09D 11/102
USPC ........... 522/91, 90, 1, 6, 189, 184, 71; 520/1
See application file for complete search history.

(56) References Cited

U.S. PATENT DOCUMENTS

| | | | |
|---|---|---|---|
| 4,233,424 A | | 11/1980 | Sueling et al. |
| 5,118,752 A | * | 6/1992 | Chang ................ C08F 2/24 524/460 |
| 5,256,731 A | | 10/1993 | Huth et al. |
| 6,663,668 B1 | | 12/2003 | Chaouk et al. |
| 2001/0025081 A1 | | 9/2001 | Takanohashi et al. |
| 2010/0075061 A1 | * | 3/2010 | Yokoi ................. C08G 18/003 522/174 |

FOREIGN PATENT DOCUMENTS

| | | | | |
|---|---|---|---|---|
| EP | 0444509 A2 | | 9/1991 | |
| EP | 2166049 A1 | | 3/2010 | |
| EP | 2653511 A1 | | 10/2013 | |
| JP | S53-136055 A | | 11/1978 | |
| JP | H05-25218 A | | 2/1993 | |
| JP | 2001040048 | * | 2/2001 | |
| JP | 2001040048 A | * | 2/2001 | .......... C08F 290/067 |
| JP | 2002-512644 A | | 4/2002 | |
| JP | 2004-269781 A | | 9/2004 | |
| JP | 2010-070692 A | | 4/2010 | |
| JP | 2011-111491 A | | 6/2011 | |
| JP | 2012092330 | * | 5/2012 | |
| JP | 2012092330 A | * | 5/2012 | |
| JP | 2013043935 | * | 3/2013 | |
| JP | 2013043935 A | * | 3/2013 | |
| JP | 2013-144764 A | | 7/2013 | |
| JP | 2014-070184 A | | 4/2014 | |
| JP | 2014-167036 A | | 9/2014 | |
| JP | 2016-155918 A | | 9/2016 | |
| WO | 98/25982 A1 | | 6/1998 | |
| WO | 2014136549 | * | 9/2014 | |
| WO | WO-2014136549 A1 | * | 9/2014 | .......... C09D 11/101 |

OTHER PUBLICATIONS

Takanohashi et al, JP 2001040048 Machine Translation, Feb. 13, 2001 (Year: 2001).*
Yokoi et al, JP 2012092330 Machine Translation, May 17, 2012 (Year: 2012).*
Araki, JP 2013043935 Machine Translation, Mar. 4, 2013 (Year: 2013).*
Yokoi, WO 2014136549 Machine Translation, Sep. 12, 2014 (Year: 2014).*
English language translation of the following: Office action dated May 15, 2024 from the SIPO in a Chinese patent application No. 202080066739.6 corresponding to the instant patent application.
International Search Report issued in International Application No. PCT/JP2020/033690 on Nov. 24, 2020.
Written Opinion of the ISA issued in International Application No. PCT/JP2020/033690 on Nov. 24, 2020.
Extended European Search Report dated Nov. 4, 2022, issued in corresponding EP Patent Application No. 20867289.9.
English language translation of the following: Office action dated Oct. 27, 2023 from the SIPO in a Chinese patent application No. 202080066739.6 corresponding to the instant patent application. This office action translation is submitted now in order to supplement the understanding of the cited references which are being disclosed in the instant Information Disclosure Statement.

(Continued)

*Primary Examiner* — Jessica Whiteley
(74) *Attorney, Agent, or Firm* — SOLARIS Intellectual Property Group, PLLC

(57) ABSTRACT

Provided are a particle including a polymer P including a bond U that is at least one selected from the group consisting of a urethane bond and a urea bond, and a hydrophilic group, a polymerizable monomer, and a moiety A that is at least one selected from the group consisting of a polysiloxane bond and a fluorinated hydrocarbon group; an aqueous dispersion; an ink jet ink; a film-forming method; and an image-forming method.

14 Claims, No Drawings

(56) References Cited

OTHER PUBLICATIONS

English language translation of the following: Office action dated Dec. 6, 2022 from the JPO in a Japanese patent application No. 2021-548749 corresponding to the instant patent application.
English language translation of the following: Decision of Refusal dated Oct. 12, 2024 from the SIPO in a Chinese patent application No. 202080066739.6 corresponding to the instant patent application.

* cited by examiner

PARTICLE, AQUEOUS DISPERSION, INK JET INK, FILM-FORMING METHOD, AND IMAGE-FORMING METHOD

CROSS-REFERENCE TO RELATED APPLICATIONS

This application is a continuation application of International Application No. PCT/JP2020/033690, filed Sep. 4, 2020, the disclosure of which is incorporated herein by reference in its entirety. Further, this application claims priority from Japanese Patent Application No. 2019-177414, filed Sep. 27, 2019, the disclosure of which is incorporated herein by reference in its entirety.

BACKGROUND OF THE INVENTION

1. Field of the Invention

The present disclosure relates to a particle, an aqueous dispersion, an ink jet ink, a film-forming method, and an image-forming method.

2. Description of the Related Art

There is a known aqueous composition containing a polyurethane resin including a polysiloxane bond.

For example, JP2014-70184A discloses, as an ink composition that can form an image having high stretchability, high blocking resistance, and high solvent resistance, an ink composition containing polyurethane resin particles having at least one moiety species selected from the group consisting of a polysiloxane group and a fluorinated alkyl group, an ethylenically unsaturated linking group, and a hydrophilic functional group, water, a polymerization initiator, and a coloring agent.

In addition, JP2011-111491A discloses, as aqueous curable resin compositions that can form a coating film having high substrate conformability, high durability such as cracking resistance, high weather resistance, and a high blocking capability for the ultraviolet light region, an aqueous curable resin composition containing a composite resin (ABC) in which a hydrophilic group-containing polyurethane (a1) and a vinyl polymer (a2) are bonded together with polysiloxane (a3) therebetween, an ultraviolet absorbent (D), and an aqueous medium, wherein resin particles containing the ultraviolet absorbent (D) within the composite resin (ABC) are dispersed in the aqueous medium.

In addition, JP2013-144764A discloses, as a clear ink composition that, on various recording media, particularly even on recording media having low ink permeability such as synthetic paper and actual printing stock, exhibits high fixability and high rub fastness, and that can provide improved ink transferability to, in a stack of printed recording media, unprinted surfaces, a clear ink composition that includes an alkanediol having 7 to 10 carbon atoms, a water-soluble alcohol serving as a solubilizing agent for dissolving the alkanediol having 7 to 10 carbon atoms, water, and silicone-based composite resin particles and that does not include coloring agents, wherein the silicone-based composite particles are formed of at least one selected from the group consisting of silicone-modified acrylic resins, silicone-modified urethane resins, silicone-modified polyester resins, silicone-modified polycarbonate resins, and silicone-modified polyimide resins.

SUMMARY OF THE INVENTION

However, in some cases, on a substrate, a film having high durability for repeated rubbing actions (namely, rubbing actions), namely rub fastness and having high adhesiveness to the substrate (hereafter, also simply referred to as "adhesiveness") needs to be formed.

Objects of embodiments according to the present disclosure are to provide a particle, an aqueous dispersion, an ink jet ink, a film-forming method, and an image-forming method that enable formation of, on a substrate, a film having high rub fastness and high adhesiveness.

Specific means for achieving the above-described objects include the following embodiments.

<1> A particle including:
a polymer P including a bond U that is at least one selected from the group consisting of a urethane bond and a urea bond and a hydrophilic group;
a polymerizable monomer; and
a moiety A that is at least one selected from the group consisting of a polysiloxane bond and a fluorinated hydrocarbon group.

<2> The particle according to <1>, wherein the polymer P includes the moiety A.

<3> The particle according to <1>, wherein the polymer P includes a polysiloxane bond.

<4> The particle according to <3>, wherein a content of the polysiloxane bond relative to a total amount of the polymer P is 0.1 mass % to 25 mass %.

<5> The particle according to <3> or <4>, wherein the polymer P includes a monovalent polysiloxane group constituted by a terminal group that is a hydrogen atom, an alkyl group having 1 to 18 carbon atoms, or a phenyl group, and a polysiloxane bond.

<6> The particle according to any one of <3> to <5>, wherein the polymer P includes a structural unit (P1), a structural unit (P2), and a structural unit (P3) below.

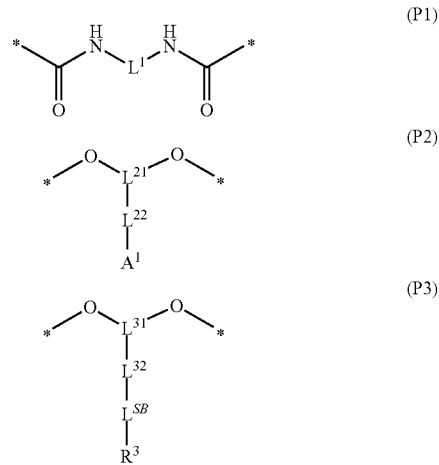

In the structural units (P1) to (P3),
$L^1$ represents a divalent organic group having 1 to 20 carbon atoms,
$L^{21}$ represents a trivalent organic group having 1 to 20 carbon atoms,
$L^{22}$ represents a single bond or a divalent organic group having 1 to 20 carbon atoms,
$A^1$ represents a carboxy group, a salt of a carboxy group, a sulfo group, or a salt of a sulfo group,
$L^{31}$ represents a trivalent organic group having 1 to 20 carbon atoms, $L^{32}$ represents a single bond or a divalent organic group having 1 to 20 carbon atoms, $L^{SB}$ represents a polysiloxane bond, $R^3$ represents a hydrogen atom, an alkyl group having 1 to 18 carbon atoms, or a phenyl group, and

* represent bonding sites.

<7> The particle according to any one of <1> to <6>, wherein the polymer P has a weight-average molecular weight of 5000 to 100000.

<8> The particle according to any one of <1> to <7>, wherein the polymer P further includes a polymerizable group.

<9> An aqueous dispersion, including:

the particle according to any one of <1> to <8>, and water.

<10> An ink jet ink, including:

the particle according to any one of <1> to <8>, and water.

<11> A film-forming method including:

applying the aqueous dispersion according to <9> onto a substrate; and curing the aqueous dispersion applied onto the substrate.

<12> An image-forming method, including:

applying the ink jet ink according to <10> onto a substrate by an ink jet process; and curing the ink jet ink applied onto the substrate.

Embodiments according to the present disclosure provide a particle, an aqueous dispersion, an ink jet ink, a film-forming method, and an image-forming method that enable formation of, on a substrate, a film having high rub fastness and high adhesiveness.

DESCRIPTION OF THE PREFERRED EMBODIMENTS

In the present disclosure, numerical ranges described as "a value 'to' another value" include the value and the other value respectively as the minimum value and the maximum value.

In the present disclosure, the amount of each of components in a composition means, when the composition contains a plurality of substances belonging to such a component, the total amount of the plurality of substances in the composition unless otherwise specified.

In the present disclosure, among numerical ranges described in series, the upper limit value or the lower limit value of a numerical range may be replaced by the upper limit value or the lower limit value of one of other numerical ranges described in series, or may be replaced by a value described in Examples.

In the present disclosure, the term "step" includes not only an independent step, but also a step that is not clearly distinguished from another step but that achieves the intended result of the step.

In the present disclosure, "*" in chemical formulas represent bonding sites.

In the present disclosure, the concept of "images" encompasses, in addition to patterned images (such as characters, symbols, and figures), solid images.

In the present disclosure, "light" is a concept that encompasses actinic energy rays such as γ-rays, β-rays, electron beams, ultraviolet radiation, and visible radiation.

In the present disclosure, ultraviolet radiation is also referred to as "UV (Ultra Violet) light".

In the present disclosure, light emitted from an LED (Light Emitting Diode) light source is also referred to as "LED light".

In the present disclosure, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

Particle

The particle according to the present disclosure (hereafter, also referred to as "specified particle")

includes a polymer P including a bond U being at least one species selected from the group consisting of a urethane bond and a urea bond and a hydrophilic group, and a polymerizable monomer, and includes a moiety A being at least one species selected from the group consisting of a polysiloxane bond and a fluorinated hydrocarbon group.

Specifically, the specified particle contains the polymer P including the bond U and a hydrophilic group, and a polymerizable monomer.

The specified particle further includes the moiety A.

The moiety A can be included in any position of the specified particle.

The moiety A may be included in the polymer P, or may be included in the polymerizable monomer. Alternatively, the specified particle may contain, as a compound other than the polymer P and the polymerizable monomer, a compound including the moiety A (for example, Compound (S1) described later).

Such specified particles can form, on a substrate, a film (for example, an image) having high rub fastness and high adhesiveness.

The reason why such advantages are provided is inferred as follows.

The specified particles can be used to form a film by, for example, applying, onto a substrate, an aqueous dispersion including the specified particles to apply the specified particles, and applying, to the specified particles applied onto the substrate, light and/or heat. As a result of these procedures, the polymerizable monomer in the specified particles applied onto the substrate (specifically, a photopolymerizable monomer and/or a thermal-polymerizable monomer) is polymerized, to form a film (namely, a cured film).

In this case, on the substrate, the interaction (for example, hydrogen bonds) between bonds U (specifically, at least one species selected from the group consisting of a urethane bond and a urea bond) causes the interaction between the specified particles, and the specified particles include a polymerizable monomer, so that a film having high hardness and high adhesiveness to the substrate is inferentially formed.

The moiety A (specifically, at least one species selected from the group consisting of a polysiloxane bond and a fluorinated hydrocarbon group) contributes to providing of lubricity to the surface of the film.

The specified particles include both of a polymerizable monomer and the moiety A, so that a cured film including both of hardness and surface lubricity is inferentially formed with high uniformity. This inferentially results in improved rub fastness of the film.

The hydrophilic group in the polymer P contributes to dispersion stability of the specified particles in an aqueous dispersion including the specified particles, which leads to contribution of preservation stability of the aqueous dispersion including the specified particles.

In addition, the hydrophilic group in the polymer P, in an ink jet ink serving as an embodiment of an aqueous dispersion including the specified particles, also contributes to improvement in the ejection performance from the ink jet head.

Hereinafter, components that can be contained in the specified particles will be described.

Moiety A

The specified particles include the moiety A, which is at least one species selected from the group consisting of a polysiloxane bond and a fluorinated hydrocarbon group.

The moiety A contributes to improvement in the lubricity of the film, which leads to contribution to improvement in the rub fastness of the film.

As described above, the moiety A can be present in any position in the specified particle.

From the viewpoint of further improving the rub fastness of the film, the polymer P preferably includes the moiety A. The reason why the polymer P that includes the moiety A results in further improvement in the rub fastness of the film is inferred as follows.

The polymer P includes a hydrophilic group. Thus, in an aqueous dispersion of the specified particles, the polymer P inferentially tends to be present in the peripheral region of such a specified particle (specifically, at or near the interface between the particle and water). When this polymer P includes the moiety A, the moiety A inferentially tends to be present in the surface of the resultant film. This inferentially results in more effective improvement in the rub fastness of the film.

When the polymer P includes the moiety A, an element other than the polymer P may also include the moiety A. For example, while the polymer P includes the moiety A, the specified particles may include a compound including the moiety A other than the polymer P (for example, Compound (S) described later).

From the viewpoint of further improving the rub fastness of the film, the specified particles (preferably the polymer P in the specified particles) preferably include a polysiloxane bond.

Stated another way, the specified particles (preferably the polymer P in the specified particles) preferably contain, as the moiety A, a polysiloxane bond and does not contain a fluorinated hydrocarbon group, or preferably contains, as the moiety A, a polysiloxane bond and a fluorinated hydrocarbon group.

Fluorinated Hydrocarbon Group

The fluorinated hydrocarbon group serving as the moiety A may be a monovalent fluorinated hydrocarbon group or a divalent fluorinated hydrocarbon group.

The fluorinated hydrocarbon group is not necessarily limited to a perfluorohydrocarbon group.

The fluorinated hydrocarbon group can be a hydrocarbon group (for example, a hydrocarbon group such as an alkyl group, an aryl group, an aralkyl group, an alkylene group, an arylene group, an alkylene-arylene group, an alkylene-arylene-alkylene group, or an arylene-alkylene-arylene group) substituted with at least one fluorine atom.

The number of carbon atoms in the fluorinated hydrocarbon group is preferably 1 to 20, more preferably 2 to 16, still more preferably 4 to 16.

The number of fluorine atoms in the fluorinated hydrocarbon group is preferably 1 to 40, more preferably 2 to 16, still more preferably 4 to 16, still more preferably 4 to 12, still more preferably 6 to 10.

Polysiloxane Bond

The polysiloxane bond serving as the moiety A is preferably the following polysiloxane bond (SB).

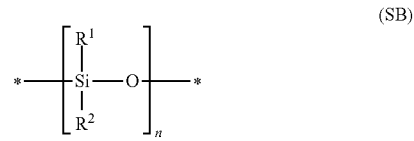

(SB)

In the polysiloxane bond (SB),
$R^1$ and $R^2$ each independently represent a hydrogen atom, an alkyl group having 1 to 18 carbon atoms, or a phenyl group,
n represents an integer of 3 or more, and
* represent bonding sites.

In the polysiloxane bond (SB), n is preferably 5 or more, more preferably 10 or more.

In the polysiloxane bond (SB), n is preferably 300 or less, more preferably 200 or less.

In the bond (SB), $R^1$ and $R^2$ each independently represent preferably an alkyl group having 1 to 18 carbon atoms or a phenyl group, more preferably an alkyl group having 1 to 6 carbon atoms or a phenyl group, still more preferably a methyl group, an ethyl group, or a phenyl group, still more preferably a methyl group or a phenyl group.

The polysiloxane bond preferably has a number-average molecular weight (Mn) of 500 to 20000, more preferably 800 to 15000, still more preferably 1000 to 12000.

From the viewpoint of further improving the rub fastness and adhesiveness of the film, the specified particles (preferably the polymer P in the specified particles) preferably include a monovalent polysiloxane group constituted by a terminal group that is a hydrogen atom, an alkyl group having 1 to 18 carbon atoms, or a phenyl group, and a polysiloxane bond (hereafter, also simply referred to as "monovalent polysiloxane group").

When the specified particles (preferably the polymer P in the specified particles) include the monovalent polysiloxane group, compared with a case where the specified particles do not include the monovalent polysiloxane group and include a polysiloxane bond at an intermediate position of the molecular chain (for example, between two structural units) (hereafter, also referred to as "divalent polysiloxane group"), the film has further improved rub fastness and adhesiveness. The reason for this is inferred that the monovalent polysiloxane group, compared with the divalent polysiloxane group, has high mobility (in other words, has a high freedom of motion) and tends to be localized in the surface portion of the film (in other words, in the film, a region on the side of the film-air interface). More specifically, the polysiloxane bond tends to be localized in the surface portion of the film, which inferentially results in further improvement in the lubricity of the surface of the film (leading to the rub fastness of the film), and further improvement in the adhesiveness between the film and the substrate.

In the monovalent polysiloxane group, the terminal group is preferably an alkyl group having 1 to 18 carbon atoms or a phenyl group, more preferably an alkyl group having 1 to 6 carbon atoms or a phenyl group, still more preferably a methyl group, an ethyl group, or a phenyl group, still more preferably a methyl group or a phenyl group.

The monovalent polysiloxane group is preferably the following polysiloxane group (SG).

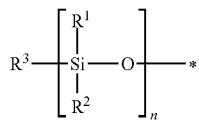

In the polysiloxane group (SG),
R¹ to R³ each independently represent a hydrogen atom, an alkyl group having 1 to 18 carbon atoms, or a phenyl group,
n represents an integer of 3 or more, and
* represents a bonding site.

In the polysiloxane group (SG), preferred examples of R¹ to R³ are the same as the preferred examples of R¹ and R² in the polysiloxane bond (SB).

In the polysiloxane group (SG), the preferred ranges of n are the same as the preferred ranges of n in the polysiloxane bond (SB).

Relative to the total solid content of the specified particles, the content of the moiety A is preferably 0.001 mass % to 20 mass %, more preferably 0.01 mass % to 15 mass %, still more preferably 0.02 mass % to 12 mass %.

Relative to the total solid content of the specified particles, the content of the polysiloxane bond is preferably 0.001 mass % to 20 mass %, more preferably 0.01 mass % to 10 mass %, still more preferably 0.02 mass % to 12 mass %.

In the present disclosure, the total solid content of the specified particles means all the components of the specified particles except for the solvent (specifically, water and the organic solvent). When the specified particles do not include solvents, the total solid content of the specified particles is the same as all the components of the specified particles.

Polymer P

The specified particles include at least one species of the polymer P.

The polymer P includes the bond U, which is at least one species selected from the group consisting of a urethane bond and a urea bond, and a hydrophilic group.

Bond U

The polymer P includes the bond U, which is at least one species selected from the group consisting of a urethane bond and a urea bond.

Thus, the polymer P is a urethane polymer, a urethane-urea polymer, or a urea polymer.

As described above, the bond U contributes to the interaction between the specified particles applied onto the substrate and improvement in the hardness of the film, which leads to contribution to improvement in the rub fastness of the film.

The bond U preferably includes a urethane bond.

Stated another way, the polymer P preferably includes a urethane bond but does not include a urea bond, or preferably includes a urethane bond and a urea bond.

Hydrophilic Group

The polymer P preferably includes at least one species of a hydrophilic group.

As described above, the hydrophilic group in the polymer P contributes to, in an aqueous dispersion of the specified particles, the dispersion stability of the specified particles, which leads to contribution to the preservation stability of the aqueous dispersion. The hydrophilic group in the polymer P also contributes to, in the aqueous dispersion that serves as an ink jet ink, the ejection performance from the ink jet head.

The hydrophilic group is preferably an anionic group or a nonionic group and, from the viewpoint of providing a strong effect of improving the dispersion stability, preferably an anionic group.

For example, of an anionic group and a nonionic group that have the same molecular weight, the anionic group provides a stronger effect of improving the dispersion stability. Thus, the anionic group (particularly preferably at least one species selected from the group consisting of a carboxy group and salts of a carboxy group) can, even in the case of having a low molecular weight, provide sufficiently the effect of improving the dispersion stability.

The nonionic group may be a group having a polyether structure, and is preferably a monovalent group including a polyalkyleneoxy group.

The anionic group may be neutralized or may not be neutralized.

Examples of the unneutralized anionic group include a carboxy group, a sulfo group, a sulfuric acid group, a phosphonic acid group, and a phosphoric acid group.

Examples of the neutralized anionic group include salts of a carboxy group, salts of a sulfo group, salts of a sulfuric acid group, salts of a phosphonic acid group, and salts of a phosphoric acid group.

In the present disclosure, the neutralized anionic group means an anionic group in the form of "salt" (for example, a salt of a carboxy group (for example, —COONa)).

The neutralization can be performed with, for example, an alkali metal hydroxide (for example, sodium hydroxide or potassium hydroxide) or an organic amine (for example, triethylamine).

The hydrophilic group in the polymer P is, from the viewpoint of dispersion stability, preferably an anionic group,
more preferably at least one species selected from the group consisting of a carboxy group, salts of a carboxy group, a sulfo group, salts of a sulfo group, a sulfuric acid group, salts of a sulfuric acid group, a phosphonic acid group, salts of a phosphonic acid group, a phosphoric acid group, and salts of a phosphoric acid group,
still more preferably at least one species selected from the group consisting of a carboxy group, salts of a carboxy group, a sulfo group, and salts of a sulfo group.

In the above-described salts of a carboxy group, salts of a sulfo group, salts of a sulfuric acid group, salts of a phosphonic acid group, and salts of a phosphoric acid group, "salts" are preferably alkali metal salts or organic amine salts, more preferably alkali metal salts.

In the alkali metal salts, the alkali metal is preferably K or Na.

When the polymer P includes, as the hydrophilic group, an anionic group (for example, at least one species selected from the group consisting of a carboxy group and salts of a carboxy group), and the total number of millimoles of the anionic group (for example, a carboxy group or a salt of a carboxy group) included in 1 g of the polymer P is defined as the acid value of the polymer P, the acid value of the polymer P is, from the viewpoint of dispersion stability, preferably 0.10 mmol/g to 2.00 mmol/g, more preferably 0.30 mmol/g to 1.50 mmol/g.

When the polymer P has, as the hydrophilic group, an anionic group, the degree of neutralization of the anionic group in the polymer P is preferably 50% to 100%, more preferably 70% to 90%.

The degree of neutralization is, in the polymer P, the ratio of "the number of neutralized anionic groups" to "the total of the number of unneutralized anionic groups (for example, carboxy groups) and the number of neutralized anionic groups (for example, a salt of carboxy groups)" (specifically, ratio [the number of neutralized anionic groups/(the number of unneutralized anionic groups+the number of neutralized anionic groups)]).

The degree of neutralization (%) in the polymer P can be measured by neutralization titration.

Moiety A

The polymer P preferably includes the moiety A (specifically, the moiety A being at least one species selected from the group consisting of a polysiloxane bond and a fluorinated hydrocarbon group).

When the polymer P includes the moiety A, the film has further improved rub fastness.

When the polymer P includes the moiety A, the content of the moiety A to the total amount of the polymer P is preferably 0.01 mass % to 35 mass %, more preferably 0.1 mass % to 25 mass %, still more preferably 0.1 mass % to 20 mass %, still more preferably 0.1 mass % to 15 mass %, still more preferably 0.1 mass % to 10 mass %.

When the polymer P includes a polysiloxane bond, the content of the polysiloxane bond relative to the total amount of the polymer P is preferably 0.01 mass % to 35 mass %, more preferably 0.1 mass % to 25 mass %, still more preferably 0.1 mass % to 20 mass %, still more preferably 0.1 mass % to 15 mass %, still more preferably 0.1 mass % to 10 mass %.

Polymerizable Group

The specified particles include, in addition to the polymer P, a polymerizable monomer described later (specifically, a compound including a polymerizable group). The polymerizable monomer contributes to the rub fastness and adhesiveness of the film. Thus, the polymer P does not necessarily include a polymerizable group.

However, from the viewpoint of further improving the rub fastness of the film, the polymer P preferably includes a polymerizable group.

The polymerizable group that can be included in the polymer P is preferably a photopolymerizable group or a thermal-polymerizable group.

The photopolymerizable group is preferably a radical-polymerizable group, more preferably a group including an ethylenically double bond, still more preferably a (meth)acryloyl group, an allyl group, a styryl group, or a vinyl group. The radical-polymerizable group is, from the viewpoint of radical polymerization reactivity and the hardness of the film to be formed, particularly preferably a (meth)acryloyl group.

The thermal-polymerizable group is preferably an epoxy group, an oxetanyl group, an aziridinyl group, an azetidinyl group, a ketone group, an aldehyde group, or a blocked isocyanate group.

The polymer P may contain a single species of a polymerizable group alone, or may contain two or more species of polymerizable groups.

The presence of the polymerizable group in the polymer P can be confirmed by, for example, Fourier transform infrared spectroscopy (FT-IR).

Weight-Average Molecular Weight (Mw)

The polymer P preferably has a weight-average molecular weight (Mw) of 3000 to 200000, more preferably 4000 to 150000, still more preferably 5000 to 100000, still more preferably 8000 to 80000.

When the polymer P has a Mw of 3000 or more, the film has further improved rub fastness.

When the polymer P has a Mw of 200000 or less, the aqueous dispersion of the specified particles has further improved dispersion stability of the specified particles.

In the present disclosure, the number-average molecular weight (Mn) and the weight-average molecular weight (Mw) mean polystyrene-equivalent values determined by gel permeation chromatography (GPC).

Examples of the columns used include TSKgel (registered trademark) SuperHZM-H, TSKgel (registered trademark) SuperHZ4000, and TSKgel (registered trademark) SuperHZ200 (all are manufactured by Tosoh Corporation).

Preferred Structure of Polymer P

The polymer P preferably includes a structural unit derived from an isocyanate compound (hereafter, also referred to as "NCO"), and a structural unit derived from a compound including an active hydrogen group.

The polymer P of the preferred example includes a bond U formed by a reaction between an isocyanate group of an isocyanate compound and an active hydrogen group in a compound including an active hydrogen group.

The active hydrogen group is preferably a hydroxy group, a primary amino group, or a secondary amino group.

For example, a reaction between an isocyanate group and a hydroxy group forms a urethane group.

Alternatively, a reaction between an isocyanate group and a primary amino group or a secondary amino group forms a urea group.

Hereinafter, the isocyanate compound and the compound including an active hydrogen group serving as raw materials for the polymer P may be referred to as raw material compounds.

As a raw material compound, the isocyanate compound may be a single compound alone or two or more compounds.

As a raw material compound, the compound including an active hydrogen group may be a single compound alone or two or more compounds.

At least one isocyanate compound serving as a raw material compound is preferably a bi- or higher functional isocyanate compound.

At least one compound including an active hydrogen group and serving as a raw material compound is preferably a compound including two or more active hydrogen groups.

Of the raw material compounds, at least one of the isocyanate compound or the compound including an active hydrogen group preferably includes a hydrophilic group. This facilitates production of the polymer P including a hydrophilic group. In this case, in the finally obtained polymer P, at least some groups of the hydrophilic groups may be provided by neutralization of a hydrophilic group of a raw material compound.

In a more preferred example, of the raw material compounds, at least one compound including an active hydrogen group is a compound including an active hydrogen group and a hydrophilic group.

When the polymer P includes the moiety A, of the raw material compounds, at least one of the isocyanate compound or the compound including an active hydrogen group preferably includes the moiety A. This facilitates production of the polymer P including the moiety A.

In a more preferred example, of the raw material compounds, at least one compound including an active hydrogen group is a compound including an active hydrogen group and the moiety A.

When the polymer P includes a polymerizable group, of the raw material compounds, at least one of the isocyanate compound or the compound including an active hydrogen group preferably includes a polymerizable group. This facilitates production of the polymer P including a polymerizable group.

In a more preferred example, of the raw material compounds, at least one compound including an active hydrogen group is a compound including an active hydrogen group and a polymerizable group.

The polymer P may be a chain polymer or a crosslinked polymer.

In the present disclosure, the chain polymer means a polymer not having a crosslinked structure; the crosslinked polymer means a polymer having a crosslinked structure.

In the present disclosure, the chain polymer may have a ring structure, or may have a branched structure.

In the case where the polymer P is a crosslinked polymer, a preferred example of the specified particles is microcapsules including a shell formed of the polymer P being a crosslinked polymer, and a core including a polymerizable monomer.

The chain polymer serving as the polymer P can be produced by causing a reaction between a bifunctional isocyanate compound and a compound including two active hydrogen groups.

The crosslinked polymer serving as the polymer P can be produced by causing a reaction between a tri- or higher functional isocyanate compound and a compound including two or more active hydrogen groups.

The crosslinked polymer serving as the polymer P can also be produced by causing a reaction between a bifunctional isocyanate compound and a compound including three or more active hydrogen groups.

Hereinafter, preferred raw material compounds will be described.

Isocyanate Compound

The isocyanate compound is preferably a bi- or higher functional isocyanate compound, more preferably a bifunctional to hexafunctional isocyanate compound.

In the case of using, as a raw material compound, a bifunctional isocyanate compound, the polymer P includes a structural unit derived from the bifunctional isocyanate compound, the following structural unit (P1).

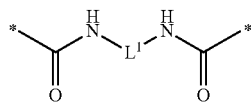
(P1)

In the structural unit (P1), $L^1$ represents a divalent organic group having 1 to 20 carbon atoms, and * represent bonding sites.

Specific examples of $L^1$ include residues provided by removing two isocyanate groups (NCO groups) from the following specific examples of the bifunctional isocyanate compound.

Specific examples of the bifunctional isocyanate compound are as follows. However, the bifunctional isocyanate compound is not limited to the following specific examples.

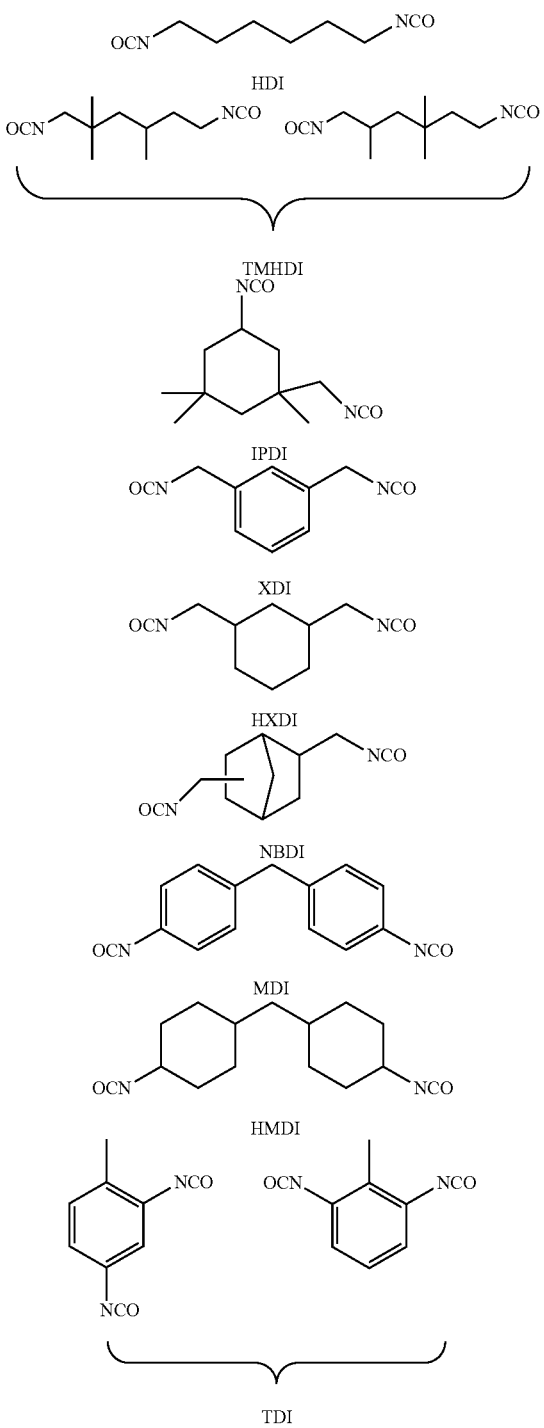

As the bifunctional isocyanate compound, bifunctional isocyanate compounds derived from the above-described specific examples are also usable. Examples include DURANATE (registered trademark) D101, D201, and A101 (manufactured by Asahi Kasei Corporation).

The tri- or higher functional isocyanate compound is preferably a reaction product of at least one selected from the group consisting of bifunctional isocyanate compounds and at least one selected from the group consisting of compounds including three or more active hydrogen groups (for example, tri- or higher functional polyol compounds, tri- or higher functional polyamine compounds, and tri- or higher functional polythiol compounds).

The number of moles (number of molecules) of the bifunctional isocyanate compound caused to react with the compound including three or more active hydrogen groups is preferably 0.6 times or more, more preferably 0.6 times to 5 times, still more preferably 0.6 times to 3 times, still more preferably 0.8 times to 2 times the number of moles of active hydrogen groups (the number of equivalents of active hydrogen groups) of the compound including three or more active hydrogen groups.

Examples of the bifunctional isocyanate compound for forming the tri- or higher functional isocyanate compound include the bifunctional isocyanate compounds described above as specific examples.

Examples of the compound including three or more active hydrogen groups for forming the tri- or higher functional isocyanate compound include compounds described in Paragraphs 0057 to 0058 in WO2016/052053A.

Examples of the tri- or higher functional isocyanate compound include adduct-type tri- or higher functional isocyanate compounds, isocyanurate-type tri- or higher functional isocyanate compounds, and biuret-type tri- or higher functional isocyanate compounds.

Examples of commercially available products of the adduct-type tri- or higher functional isocyanate compounds include TAKENATE (registered trademark) D-102, D-103, D-103H, D-103M2, P49-75S, D-110N, D-120N, D-140N, D-160N (all are manufactured by Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

Examples of commercially available products of the isocyanurate-type tri- or higher functional isocyanate compounds include TAKENATE (registered trademark) D-127N, D-170N, D-170HN, D-172N, D-177N (all are from Mitsui Chemicals, Inc.), SUMIDUR N3300, DESMODUR (registered trademark) N3600, N3900, Z4470BA (all are from Sumika Bayer Urethane Co., Ltd.), CORONATE (registered trademark) HX, HK (all are from Nippon Polyurethane Industry Co., Ltd.), DURANATE (registered trademark) TPA-100, TKA-100, TSA-100, TSS-100, TLA-100, and TSE-100 (all are from Asahi Kasei Corporation). Examples of commercially available products of the biuret-type tri- or higher functional isocyanate compounds include TAKENATE (registered trademark) D-165N, NP1100 (all are from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

At least one isocyanate compound serving as a raw material compound may be an isocyanate compound including a hydrophilic group. For the isocyanate compound including a hydrophilic group, reference can be made to Paragraphs 0112 to 0118 and Paragraphs 0252 to 0254 of WO2016/052053A.

At least one isocyanate compound serving as a raw material compound may be an isocyanate compound including a polymerizable group. For the isocyanate compound including a polymerizable group, reference can be made to Paragraphs 0084 to 0089, 0203, and 0205 of WO2016/052053A.

At least one isocyanate compound serving as a raw material compound may be an isocyanate compound including the moiety A.

Compound Including Active Hydrogen Group

The compound including an active hydrogen group is preferably a compound including two or more active hydrogen groups.

The compound including two or more active hydrogen groups is more preferably a polyol compound (specifically, a compound having two or more hydroxy groups) or a polyamine compound (specifically, a compound having two or more amino groups).

In the case of using, as the raw material compound, the compound including an active hydrogen group and a hydrophilic group, the polymer P preferably includes at least one species of the following structural unit (PO).

(PO)

In the structural unit (PO),
$L^0$ represents a divalent organic group,
$Y^1$ and $Y^2$ each independently represent an oxygen atom, a sulfur atom, or a —$NR^1$— group,
$R^1$ represents a hydrogen atom or a hydrocarbon group having 1 to 10 carbon atoms, and
* represent bonding sites.

In the structural unit (PO), the divalent organic group represented by $L^0$ may be a group composed of carbon atoms and hydrogen atoms, or may be a group including carbon atoms and hydrogen atoms and further including a heteroatom (for example, an oxygen atom, a nitrogen atom, or a sulfur atom).

The divalent organic group represented by $L^0$ may include at least one of a hydrophilic group, a polymerizable group, or the moiety A.

Specific examples of $L^0$ include residues provided by removing two active hydrogen groups from specific examples of the compound including two or more active hydrogen groups described later.

$R^1$ is preferably a hydrogen atom or a hydrocarbon group having 1 to 6 carbon atoms, more preferably a hydrogen atom or a hydrocarbon group having 1 to 3 carbon atoms.

$Y^1$ and $Y^2$ are each independently preferably an oxygen atom or a —$NR^1$— group, more preferably an oxygen atom.

The following are specific examples of diol compounds serving as compounds including an active hydrogen group; however, the compound including an active hydrogen group is not limited to the following specific examples.

(1)

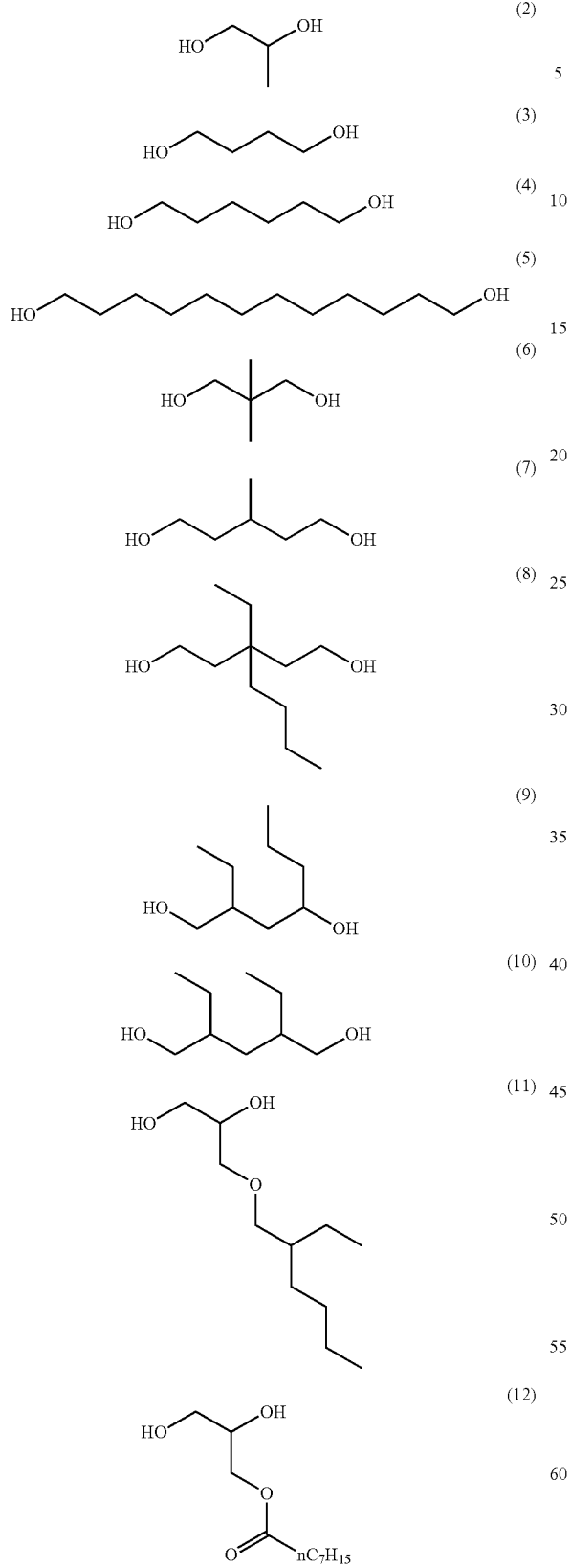
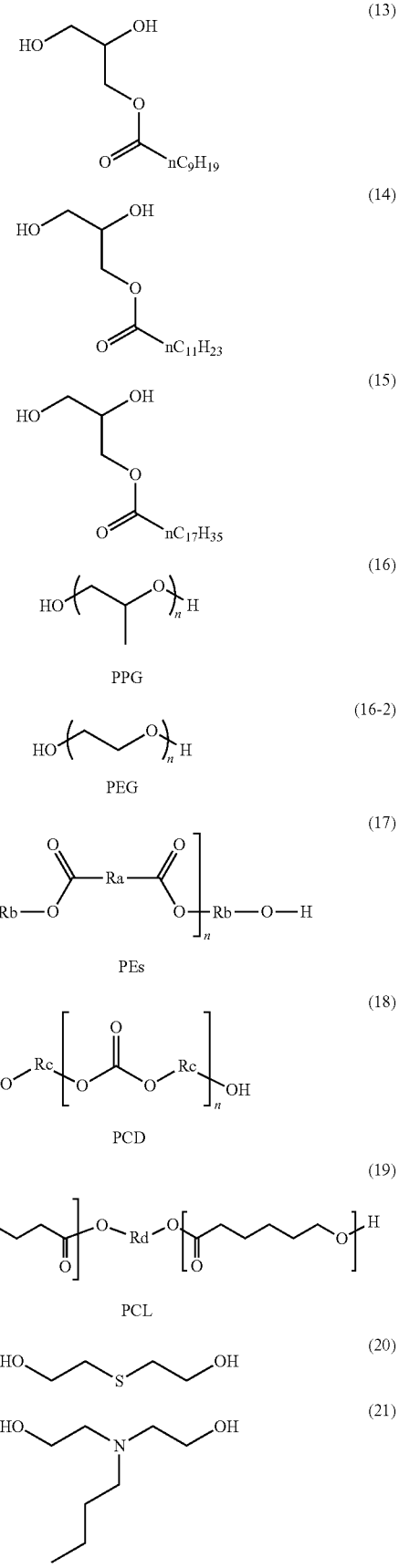

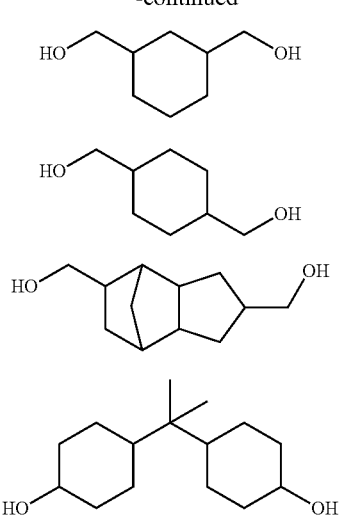

(22)
(23)
(24)
(25)

In Compounds (12) to (15), $nC_7H_{15}$, $nC_9H_{19}$, $nC_{11}H_{23}$, and $nC_{17}H_{35}$ respectively represent a normal heptyl group, a normal nonyl group, a normal undecyl group, and a normal heptadecyl group.

Compound (16) PPG is a polypropylene glycol where n is the repeat number.

Compound (16-2) PEG is a polyethylene glycol where n is the repeat number.

Compound (17) PEs is a polyester diol where n is the repeat number, and Ra and two Rb's are each independently a divalent hydrocarbon group having 2 to 25 carbon atoms. In Compound (17) PEs, n Ra's may be the same or different. In Compound (17) PEs, (n+1) Rb's may be the same or different.

Compound (18) PC is a polycarbonatediol where n is the repeat number, and (n+1) Rc's are each independently an alkylene group having 2 to 12 (preferably 3 to 8, more preferably 3 to 6) carbon atoms. In Compound (18) PC, (n+1) Rc's may be the same or different.

Compound (19) PCL is a polycaprolactonediol where n and m are the repeat numbers, and Rd is an alkylene group having 2 to 25 carbon atoms.

Compound Including Active Hydrogen Group and Polymerizable Group

The compound including an active hydrogen group may be a compound including an active hydrogen group and a polymerizable group.

The compound including an active hydrogen group and a polymerizable group is suitable as a compound for introducing a polymerizable group into the polymer P (hereafter, also referred to as "polymerizable-group-introducing compound").

The following are specific examples of diol compounds serving as compounds including an active hydrogen group and a polymerizable group; however, the compound including an active hydrogen group and a polymerizable group is not limited to the following specific examples.

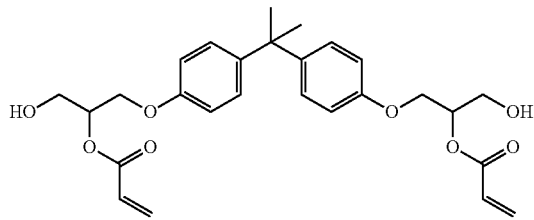

(26)

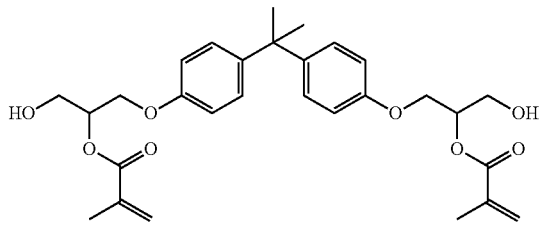

(27)

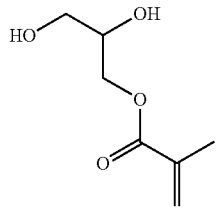

(28)

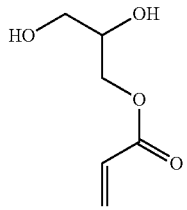

(29)

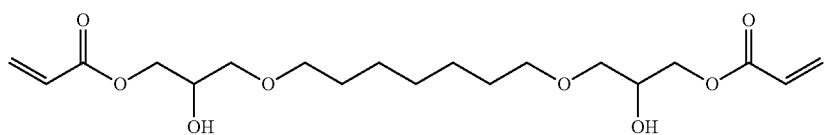

(30)

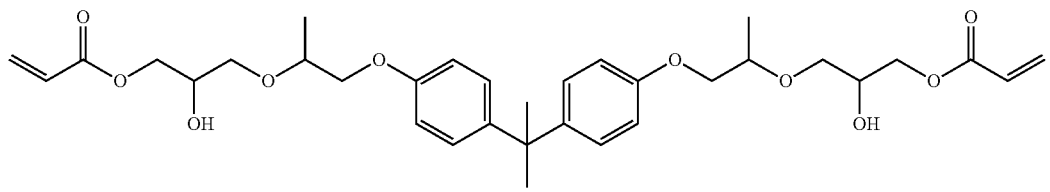

(31)

(32)

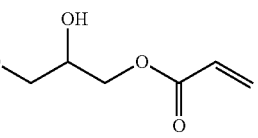

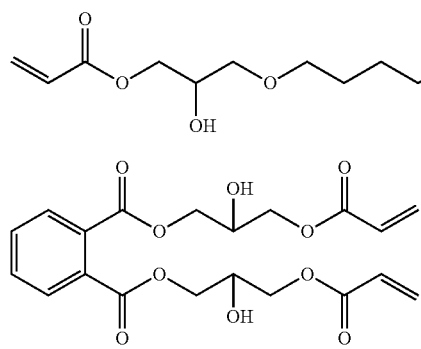

(33)

(34)

DA-721

DA-722

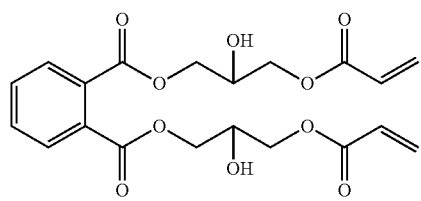

(35)

(36)

DA-911M
n=1

DA-920
n=2

(37)

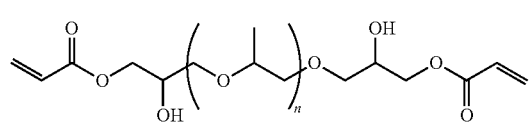 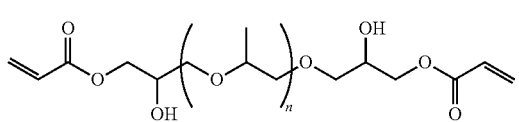

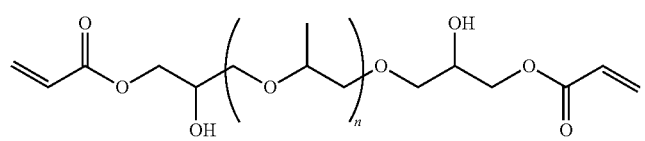

DA-931
n=11

For the compound including an active hydrogen group and a polymerizable group, reference can be appropriately made to Paragraphs 0075 to 0089 of WO2016/052053A.

Compound Including Active Hydrogen Group and Hydrophilic Group

The compound including an active hydrogen group may be a compound including an active hydrogen group and a hydrophilic group.

The compound including an active hydrogen group and a hydrophilic group is suitable as a compound for introducing a hydrophilic group into the polymer P (hereafter, also referred to as "hydrophilic-group-introducing compound").

In the case of using, as a raw material compound, the compound including an active hydrogen group and a hydrophilic group, the polymer P preferably includes the following structural unit (P2).

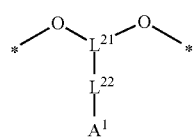

(P2)

In the structural unit (P2),
$L^{21}$ represents a trivalent organic group having 1 to 20 carbon atoms,
$L^{22}$ represents a single bond or a divalent organic group having 1 to 20 carbon atoms,
$A^1$ represents a carboxy group, a salt of a carboxy group, a sulfo group, or a salt of a sulfo group, and
* represent bonding sites.

In the trivalent organic group having 1 to 20 carbon atoms represented by $L^{21}$, the number of carbon atoms is preferably 2 to 20, more preferably 3 to 20, still more preferably 4 to 20.

The trivalent organic group represented by $L^{21}$ is preferably a trivalent hydrocarbon group or a group in which at least one carbon atom in a trivalent hydrocarbon group is replaced by a heteroatom (preferably an oxygen atom, a sulfur atom, or a nitrogen atom).

In the divalent organic group having 1 to 20 carbon atoms represented by $L^{22}$, the number of carbon atoms is preferably 1 to 10, more preferably 1 to 6.

The divalent organic group represented by $L^{22}$ is preferably a divalent hydrocarbon group (preferably an alkylene group) or a group in which at least one carbon atom in a divalent hydrocarbon group (preferably an alkylene group) is replaced by an oxygen atom or a sulfur atom (preferably an oxygen atom).

$L^{22}$ may be a single bond.

The following are specific examples of the compound including an active hydrogen group and a hydrophilic group; however, the compound including an active hydrogen group and a hydrophilic group is not limited to the following specific examples. In the following specific examples, the carboxy groups and the sulfo group may be neutralized (specifically, may be salts of carboxy groups and a salt of a sulfo group).

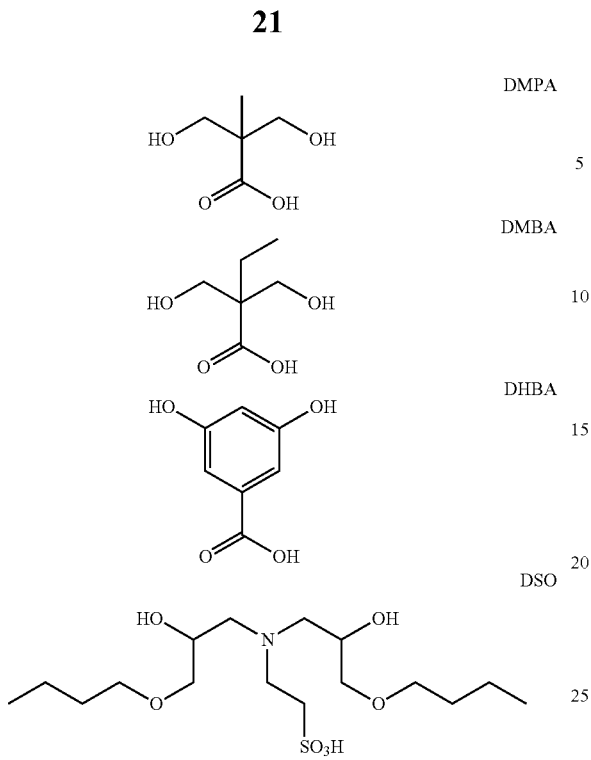

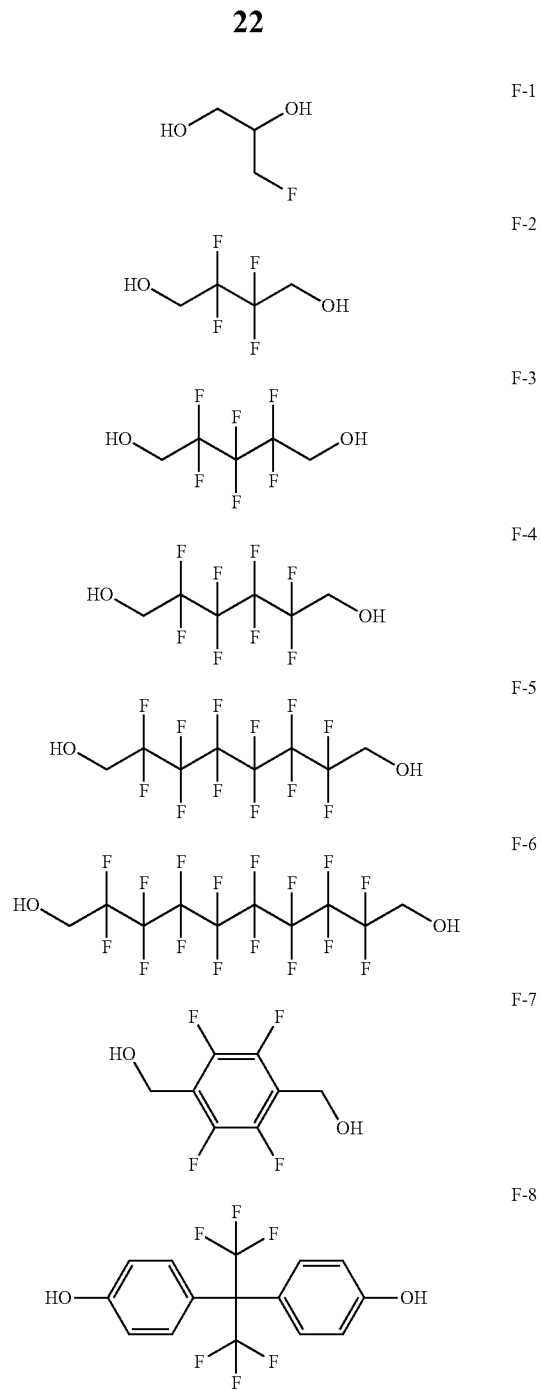

For the compound including an active hydrogen group and a hydrophilic group, reference can be appropriately made to Paragraphs 0112 to 0118 and Paragraphs 0252 to 0254 of WO2016/052053A.

Compound Including Active Hydrogen Group and Moiety A

The compound including an active hydrogen group may also be a compound including an active hydrogen group and the moiety A (specifically, the moiety A being at least one species selected from the group consisting of a polysiloxane bond and a fluorinated hydrocarbon group).

The compound including an active hydrogen group and the moiety A is suitable as a compound for introducing the moiety A into the polymer P (hereafter, also referred to as "moiety-A-introducing compound").

The compound including an active hydrogen group and the moiety A is preferably a compound including an active hydrogen group and a fluorinated hydrocarbon group, or a compound including an active hydrogen group and a polysiloxane bond.

Compound Including Active Hydrogen Group and Fluorinated Hydrocarbon Group

The compound including an active hydrogen group and a fluorinated hydrocarbon group is suitable as a compound for introducing a fluorinated hydrocarbon group into the polymer P (hereafter, also referred to as "fluorinated-hydrocarbon-group-introducing compound").

The following are specific examples of the compound including an active hydrogen group and a fluorinated hydrocarbon group. However, the compound including an active hydrogen group and a fluorinated hydrocarbon group is not limited to the following specific examples.

Compound Including Active Hydrogen Group and Polysiloxane Bond

The compound including an active hydrogen group and a polysiloxane bond is suitable as a compound for introducing a polysiloxane bond into the polymer P (hereafter, also referred to as "polysiloxane-bond-introducing compound").

The following are specific examples of the compound including an active hydrogen group and a polysiloxane bond. However, the compound including an active hydrogen group and a polysiloxane bond is not limited to the following specific examples.

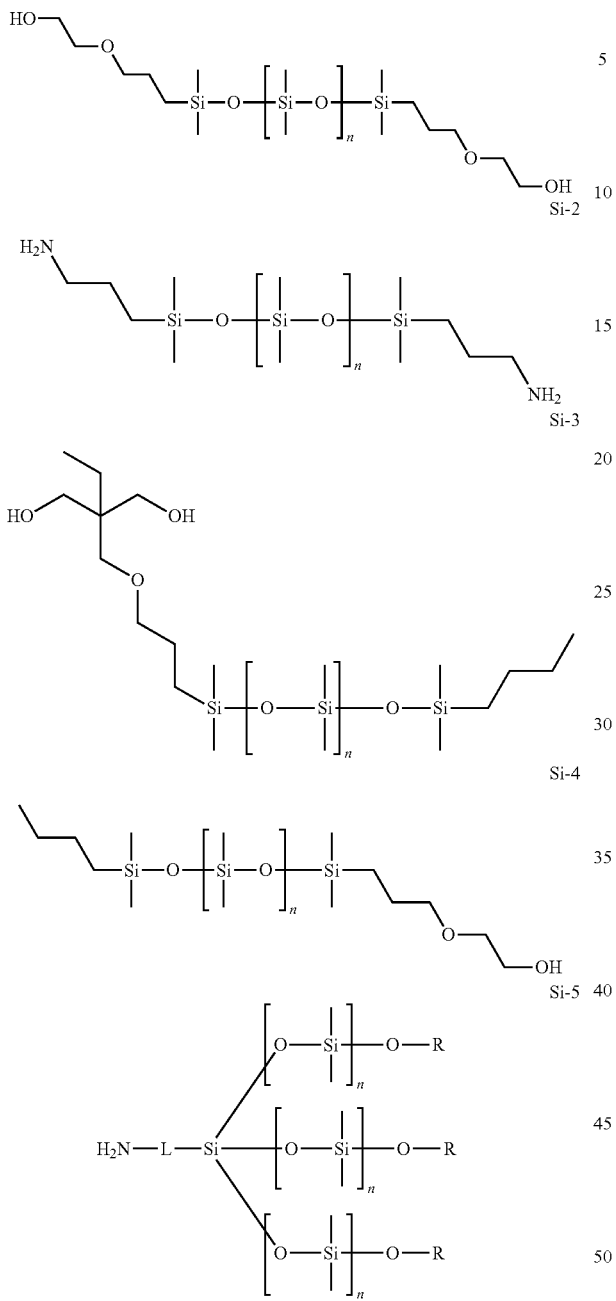

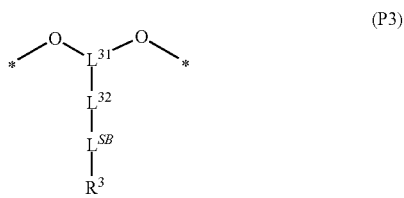

In these specific examples, n have the same definition and preferred ranges as in n in the above-described polysiloxane bond (SB).

In Si-5, L represents a divalent organic group having 1 to 20 carbon atoms. The divalent organic group represented by L has the same preferred ranges as in the divalent organic group represented by $L^{22}$ in the structural unit (P2).

In Si-5, three R's each have the same definition and preferred examples as in $R^3$ in the above-described polysiloxane group (SG).

In the case of using, as a raw material compound, the compound including an active hydrogen group and a polysiloxane bond, the polymer P preferably includes the following structural unit (P3).

The following structural unit (P3) includes, as "-$L^{SB}$-$R^3$", the above-described monovalent polysiloxane group. Thus, when the polymer P includes the following structural unit (P3), the film has further improved rub fastness and adhesiveness.

(P3)

In the structural unit (P3),
$L^{31}$ represents a trivalent organic group having 1 to 20 carbon atoms,
$L^{32}$ represents a single bond or a divalent organic group having 1 to 20 carbon atoms,
$L^{SB}$ represents a polysiloxane bond,
$R^3$ represents a hydrogen atom, an alkyl group having 1 to 18 carbon atoms, or a phenyl group, and
* represent bonding sites.

In the structural unit (P3), $R^3$ has the same definition and preferred examples as in $R^3$ in the above-described polysiloxane group (SG).

$L^{SB}$ in the structural unit (P3) has the same preferred examples as the above-described preferred examples of the polysiloxane bond (SB).

In the structural unit (P3), $L^{31}$ and $L^{32}$ respectively have the same preferred examples as the preferred examples of $L^{21}$ and $L^{22}$ in the structural unit (P2).

From the viewpoint of further improving the rub fastness of the film, the polymer P, preferably includes a polysiloxane bond, more preferably includes the above-described monovalent polysiloxane group, still more preferably includes the structural unit (P1), the structural unit (P2), and the structural unit (P3).

The content of the polymer P contained in the specified particles is, from the viewpoint of improving the curing sensitivity of the film and the hardness of the film, relative to the total solid content of the specified particles, preferably 10 mass % to 80 mass %, more preferably 20 mass % to 70 mass %, still more preferably 20 mass % to 60 mass %, still more preferably 30 mass % to 50 mass %.

Polymerizable Monomer

The specified particles include at least one species of a polymerizable monomer.

The polymerizable monomer contributes to improvements in the rub fastness and the adhesiveness of the film.

The specified particles may include a single species of a polymerizable monomer alone or may include two or more species of polymerizable monomers.

As the polymerizable monomer included in the specified particles, compounds described in Paragraphs 0097 to 0105 of WO2016/052053A may be used.

The polymerizable monomer that can be included in the specified particles is preferably a photopolymerizable monomer or a thermal-polymerizable monomer.

The photopolymerizable monomer has a property of being polymerized upon irradiation with light. The photopolymerizable monomer is preferably a radical-polymerizable monomer.

The thermal-polymerizable monomer has a property of being polymerized upon heating or irradiation with infrared radiation.

In the present disclosure, an example of the aqueous dispersion (for example, an ink) in which the specified particles include a photopolymerizable monomer may be referred to as "photocurable aqueous dispersion"; an example of the aqueous dispersion in which the specified particles include a thermal-polymerizable monomer may be referred to as "thermosetting aqueous dispersion".

The film formed from the aqueous dispersion according to the present disclosure can be cured by, in a case where the aqueous dispersion according to the present disclosure is a photocurable aqueous dispersion, subjecting the film to irradiation with light (refer to a curing step A described later) or, in a case where the aqueous dispersion according to the present disclosure is a thermosetting aqueous dispersion, subjecting the film to heating or irradiation with infrared radiation (refer to a heating step or a curing step B described later).

The photocurable aqueous dispersion particularly preferably has a form in which the specified particles include a radical-polymerizable monomer.

When the specified particles include, as a polymerizable monomer, a photopolymerizable monomer, the specified particles preferably further include a photopolymerization initiator described later.

When the specified particles include, as a polymerizable monomer, a thermal-polymerizable monomer, the specified particles may further include at least one of a photothermal conversion agent or a thermosetting accelerator described later.

The content of the polymerizable monomer contained in the specified particles is, from the viewpoint of improving the curing sensitivity of the film and the hardness of the film, relative to the total solid content of the specified particles, preferably 10 mass % to 90 mass %, more preferably 20 mass % to 80 mass %, still more preferably 30 mass % to 70 mass %, still more preferably 40 mass % to 70 mass %.

The polymerizable monomer preferably has a molecular weight of 100 to 4000, still more preferably 100 to 2000, still more preferably 100 to 1000, still more preferably 100 to 900, still more preferably 100 to 800, particularly preferably 150 to 750.

Photopolymerizable Monomer

The photopolymerizable monomer may be a radical-polymerizable monomer or a cationic-polymerizable monomer, and is preferably a radical-polymerizable monomer.

The radical-polymerizable monomer has a radical-polymerizable group in the molecular structure.

Preferred examples of the radical-polymerizable group of the radical-polymerizable monomer are the same as the above-described preferred examples of the radical-polymerizable group that can be included in the polymer P.

Examples of the radical-polymerizable monomer include acrylate compounds, methacrylate compounds, styrene compounds, vinylnaphthalene compounds, N-vinyl heterocyclic compounds, unsaturated polyesters, unsaturated polyethers, unsaturated polyamides, and unsaturated urethanes.

The radical-polymerizable monomer is preferably a compound having an ethylenically unsaturated group.

When the specified particles include the radical-polymerizable monomer, the specified particles may include a single species of the radical-polymerizable monomer alone, or may include two or more species of the radical-polymerizable monomers.

Examples of the acrylate compounds include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isostearyl acrylate, 2-ethylhexyl diglycol acrylate, 2-hydroxybutyl acrylate, 2-acryloyloxyethylhydrophthalic acid, ethoxydiethylene glycol acrylate, methoxydiethylene glycol acrylate, methoxypolyethylene glycol acrylate, methoxypropylene glycol acrylate, 2-hydroxy-3-phenoxypropyl acrylate, vinyl ether acrylate, 2-acryloyloxyethyl succinate, 2-acryloyloxy phthalate, 2-acryloxyethyl-2-hydroxyethyl phthalate, lactone-modified acrylate, acryloylmorpholine, acrylamide, and substituted acrylamides (for example, N-methylolacrylamide and diacetoneacrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxyneopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, 8-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compounds include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compounds include styrene, p-methylstyrene, p-methoxystyrene, β-methylstyrene, p-methyl-β-methylstyrene, α-methylstyrene, and p-methoxy-β-methylstyrene.

Examples of the vinylnaphthalene compounds include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinylheterocyclic compounds include N-vinylcarbazole, N-vinylpyrrolidone, N-vinylethylacetamide, N-vinylpyrrole, N-vinylphenothiazine, N-vinylacetanilide, N-vinylethylacetamide, N-vinylsuccinimide, N-vinylphthalimide, N-vinylcaprolactam, and N-vinylimidazole.

Other examples of the radical-polymerizable monomer include N-vinylamides such as allyl glycidyl ether, diallyl phthalate, triallyl trimellitate, and N-vinylformamide.

Of these radical-polymerizable monomers, a preferred bi- or lower functional radical-polymerizable monomer is at least one selected from the group consisting of 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

A preferred tri- or higher functional radical-polymerizable monomer is at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The specified particles may include a combination of a bi- or lower functional radical-polymerizable monomer and a tri- or higher functional radical-polymerizable monomer. In this case, the bi- or lower functional radical-polymerizable monomer mainly further improves the adhesiveness between the film and the substrate, and the tri- or higher functional radical-polymerizable monomer mainly further improves the hardness of the film.

Examples of the combination of a bi- or lower functional radical-polymerizable monomer and a tri- or higher functional radical-polymerizable monomer include a combination of a bifunctional acrylate compound and a trifunctional acrylate compound, a combination of a bifunctional acrylate compound and a pentafunctional acrylate compound, and a combination of a monofunctional acrylate compound and a tetrafunctional acrylate compound.

From the viewpoint of further improving the adhesiveness between the film and the substrate, at least one species of a radical-polymerizable monomer that can be included in the specified particles is preferably a radical-polymerizable monomer having a ring structure (hereafter, also referred to as "cyclic radical-polymerizable monomer").

Examples of the cyclic radical-polymerizable monomer include cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanurate triacrylate, and 8-caprolactone-modified tris-(2-acryloxyethyl) isocyanurate.

Other examples include bi- or higher functional cyclic radical-polymerizable monomers described below.

From the viewpoint of further improving the adhesiveness between the film and the substrate, at least one species of the radical-polymerizable monomer that can be included in the specified particles is preferably a polymerizable monomer including, in a single molecule, one or more ring structures and two or more (meth)acryloyl groups (hereafter, also referred to as "bi- or higher functional cyclic radical-polymerizable monomer").

Examples of the bi- or higher functional cyclic radical-polymerizable monomer include
tricyclodecanedimethanol di(meth)acrylate,
bisphenol A ethylene oxide (EO) adduct di(meth)acrylate,
bisphenol A propylene oxide (PO) adduct di(meth)acrylate,
ethoxylated bisphenol A di(meth)acrylate,
alkoxylated dimethyloltricyclodecane di(meth)acrylate,
alkoxylated cyclohexanonedimethanol di(meth)acrylate, and
cyclohexanonedimethanol di(meth)acrylate.

When the specified particles include a radical-polymerizable monomer, the content of the bi- or higher functional cyclic radical-polymerizable monomer relative to the total amount of the radical-polymerizable monomer is preferably 10 mass % to 100 mass %, more preferably 30 mass % to 100 mass %, particularly preferably 40 mass % to 100 mass %.

In addition to the above-described radical-polymerizable monomers, there are other usable radical-polymerizable monomers such as commercially available products described in, for example, "Crosslinking agent handbook", edited by Shinzo YAMASHITA (1981, TAISEISHA LTD.); "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.); and radical-polymerizable and crosslinkable monomers publicly known in the industry.

Examples of the cationic-polymerizable monomer include epoxy compounds, vinyl ether compounds, and oxetane compounds.

The cationic-polymerizable monomer is preferably a compound having at least one olefin, thioether, acetal, thioxane, thietane, aziridine, N heterocycle, O heterocycle, S heterocycle, P heterocycle, aldehyde, lactam, or cyclic ester group.

Other examples of the cationic-polymerizable monomer include compounds described in J. V. Crivello et al. "Advances in Polymer Science", 62, pages 1 to 47 (1984), Lee et al. "Handbook of Epoxy Resins", McGraw Hill Book Company, New York (1967), and P. F. Bruins et al. "Epoxy Resin Technology", (1968).

There are also photopolymerizable monomers that are known photocurable polymerizable monomers used for photopolymerizable compositions and described in patent publications such as JP1995-159983A (JP-H7-159983A), JP1995-31399B (JP-H7-31399B), JP1996-224982A (JP- H8-224982A), JP1998-863A (JP-H10-863A), JP1997-134011A (JP-H9-134011A), and JP2004-514014A. These monomers are also applicable as polymerizable monomers that can be included in the specified particles.

The photopolymerizable monomer may be a commercially available product on the market.

Examples of the commercially available product of the photopolymerizable monomer include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all are from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all are from Sartomer), A-NOD-N(NDDA, bifunctional), A-DOD-N(DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all are from Shin Nakamura Chemical Co., Ltd.), UV-7510B (trifunctional) (The Nippon Synthetic Chemical Industry Co., Ltd.), KAYARAD DPCA-30 (hexafunctional), and KAYARAD DPEA-12 (hexafunctional) (all are from Nippon Kayaku Co., Ltd.).

Other preferred examples of the polymerizable monomer include commercially available products such as NPGPODA (neopentyl glycol propylene oxide adduct diacrylate), SR531, SR285, SR256 (all are from Sartomer), A-DHP (dipentaerythritol hexaacrylate, Shin Nakamura Chemical Co., Ltd.), ARONIX (registered trademark) M-156 (TOAGOSEI CO., LTD.), V-CAP (BASF), and VISCOAT #192 (OSAKA ORGANIC CHEMICAL INDUSTRY LTD.).

Of these commercially available products, in particular, preferred are photopolymerizable monomers having a ring structure that are SR506, SR833S, A-9300, and A-9300-CL, and particularly preferred is SR833S.

Thermal-Polymerizable Monomer

The thermal-polymerizable monomer can be selected from the group consisting of polymerizable monomers that can be polymerized upon heating or irradiation with infrared radiation. Examples of the thermal-polymerizable monomer include epoxy compounds, oxetane compounds, aziridine compounds, azetidine compounds, ketone compounds, aldehyde compounds, and blocked isocyanate compounds.

Examples of the epoxy compounds include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epichlorohydrin-bisphenol S-derived epoxide, epoxidized styrene, epichlorohydrin-bisphenol F-derived epoxide, epichlorohydrin-bisphenol A-derived epoxide, epoxidized novolac, and alicyclic diepoxide; and tri- or higher functional epoxy compounds such as polyglycidyl esters of polybasic acids, polyglycidyl ethers of polyols, polyglycidyl ethers of polyoxyalkylene glycols, polyglycidyl esters of aromatic polyols, urethane polyepoxy compounds, and polyepoxy polybutadiene.

Examples of the commercially available product of the epoxy compounds include EPICLON (registered trademark) 840 (DIC Corporation).

Examples of the oxetane compounds include 3-ethyl-3-hydroxymethyl-1-oxetane, 1,4bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

Examples of the blocked isocyanate compounds include compounds provided by deactivating isocyanate compounds using blocking agents (active hydrogen-containing compounds).

Preferred examples of the isocyanate compounds include hexamethylene diisocyanate, isophorone diisocyanate, toluyl diisocyanate, xylylene diisocyanate, hexamethylene diisocyanate trimer, trimethylhexylylene diisocyanate, diphenylmethane diisocyanate, dicyclohexylmethane diisocyanate, hydrogenated xylylene diisocyanate, commercially available isocyanates such as TAKENATE (registered trademark; Mitsui Chemicals, Inc.), DURANATE (registered trademark; Asahi Kasei Corporation), and Bayhydur (registered trademark; Bayer AG), and bi- or higher functional isocyanates that are combinations of the foregoing.

Examples of the blocking agents include lactams [for example, s-caprolactam, δ-valerolactam, and γ-butyrolactam], oximes [for example, acetoxime, methyl ethyl ketoxime (MEK oxime), methyl isobutyl ketoxime (MIBK oxime), and cyclohexanone oxime], amines [for example, aliphatic amines (such as dimethylamine, diisopropylamine, di-n-propylamine, and diisobutylamine), alicyclic amines (such as methylhexylamine and dicyclohexylamine), aromatic amines (such as aniline and diphenylamine)], aliphatic alcohols [for example, methanol, ethanol, 2-propanol, and n-butanol], phenols and alkylphenols [for example, phenol, cresol, ethylphenol, n-propylphenol, isopropylphenol, n-butylphenol, octylphenol, nonylphenol, xylenol, diisopropylphenol, and di-t-butylphenol], imidazoles [for example, imidazole and 2-methylimidazole], pyrazoles [for example, pyrazole, 3-methylpyrazole, and 3,5-dimethylpyrazole], imines [for example, ethyleneimine and polyethyleneimine], active methylenes [for example, dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of the foregoing. In particular, preferred blocking agents are oximes, lactams, pyrazoles, active methylenes, and amines.

The blocked isocyanate compounds may be commercially available products on the market, and preferred examples include Trixene (registered trademark) BI7982, BI7641, BI7642, BI7950, BI7960, BI7991 (Baxenden Chemicals LTD), and Bayhydur (registered trademark; Bayer AG). Other preferred examples include the compound group described in Paragraph 0064 of WO2015/158654A.

The specified particles including the above-described specified polymer and the above-described polymerizable monomer can be produced by, for example, emulsifying a mixture provided by mixing together an oil-phase component including the specified polymer and the polymerizable monomer, and an aqueous-phase component.

Radical Polymerization Initiator

The specified particles may include at least one radical polymerization initiator.

In the present disclosure, the radical polymerization initiator means a compound that absorbs light to generate a radical.

However, compounds that absorb light to generate a radical, but that also belong to the above-described photoacid generators are not included in the concept of the radical polymerization initiator according to the present disclosure.

When the specified particles include, as the polymerizable monomer, a radical-polymerizable monomer, the specified particles preferably include at least one radical polymerization initiator.
In this case, the formed film has further improved rub fastness and adhesiveness.

The reason for this is inferred that the radical-polymerizable group in the radical-polymerizable monomer and the radical polymerization initiator are positioned close to each other, which results in improvement in the curing sensitivity of the film (hereafter, also simply referred to as "sensitivity").

When the specified particles include a radical polymerization initiator, radical polymerization initiators that have high sensitivity, but have low dispersibility or low solubility in water and hence have been unsuitable (for example, radical polymerization initiators having a degree of solubility in water at 25° C. of 1.0 mass % or less) become usable. This broadens the range of choices of the radical polymerization initiator employed, which also leads to broadening of range of choices of the light source employed. This can provide higher curing sensitivity than before.

Specific examples of the above-described radical polymerization initiators that have high sensitivity, but have low dispersibility or low solubility in water and hence have been unsuitable include carbonyl compounds and acylphosphine oxide compounds described later, and preferred are acylphosphine oxide compounds.

Thus, in the aqueous dispersion and the ink according to the present disclosure, a substance having a low solubility in water can be included in the specified particles, to thereby be contained in the aqueous dispersion and the ink according to the present disclosure, which are aqueous compositions.

Examples of the aqueous dispersion and the ink in which the specified particles include a radical polymerization initiator also have higher preservation stability than existing photocurable compositions. The reason for this is inferred that the radical polymerization initiator is included in the specified particles, so that aggregation or sedimentation of the radical polymerization initiator is suppressed.

For the radical polymerization initiator, for example, reference can be appropriately made to Paragraphs 0091 to 0094 of WO2016/052053A.

The radical polymerization initiator is more preferably (a) a carbonyl compound such as an aromatic ketone or (b) an acylphosphine oxide compound; specific examples include bis(2,4,6-trimethylbenzoyl)-phenylphosphine oxide (for example, IRGACURE (registered trademark) 819 manufactured by BASF), 2-(dimethylamino)-1-(4-morpholinophenyl)-2-benzyl-1-butanone (for example, IRGACURE (registered trademark) 369 manufactured by BASF), 2-methyl-1-(4-methylthiophenyl)-2-morpholinopropan-1-one (for example, IRGACURE (registered trademark) 907 manufactured by BASF), 1-hydroxy-cyclohexyl-phenyl-ketone (for example, IRGACURE (registered trademark) 184 manufactured by BASF), and 2,4,6-trimethylbenzoyl-diphenyl-phosphine oxide (for example, DAROCUR (registered trademark) TPO and LUCIRIN (registered trademark) TPO (both are manufactured by BASF)).

Of these, from the viewpoints of, for example, improving the sensitivity and suitability for LED light, the internally included photopolymerization initiator is preferably (b) the acylphosphine oxide compound, more preferably a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide).

The wavelength of LED light is preferably 355 nm, 365 nm, 385 nm, 395 nm, or 405 nm.

The example of the specified particles including a radical polymerization initiator can be produced by, for example, emulsifying a mixture provided by mixing together an oil-phase component including the polymer P (or a raw material compound for producing the polymer P), a radical-polymerizable monomer, and a photopolymerization initiator, and an aqueous-phase component.

The content of the radical polymerization initiator relative to the total solid content of the specified particles is preferably 0.1 mass % to 15 mass %, more preferably 0.5 mass % to 10 mass %, still more preferably 1 mass % to 6 mass %.

Sensitizer

The specified particles may include at least one sensitizer.

When the specified particles include at least one photopolymerization initiator, the specified particles preferably include at least one sensitizer.

When the specified particles contain a sensitizer, decomposition of the photopolymerization initiator upon irradiation with an actinic energy ray can be further accelerated.

The sensitizer is a substance that absorbs the specified actinic energy ray and turns into an electroexcitation state. The sensitizer in the electroexcitation state upon contact with the photopolymerization initiator exerts an action such as electron transfer, energy transfer, or heat generation. This accelerates a chemical change of the photopolymerization initiator, specifically, for example, decomposition and generation of a radical, an acid, or a base.

Examples of the sensitizer include benzophenone, thioxanthone, isopropylthioxanthone, anthraquinone, 3-acyl-coumarin derivatives, terphenyl, styryl ketone, 3-(aroylmethylene)thiazoline, camphorquinone, eosine, rhodamine, and erythrosine.

Other preferred examples of the sensitizer include the compound represented by General formula (i) in JP2010-24276A and the compound represented by General formula (I) in JP1994-107718A (JP-H6-107718A).

Of the above-described examples, the sensitizer is, from the viewpoint of suitability for LED light and the reactivity to the photopolymerization initiator, preferably at least one selected from the group consisting of thioxanthone, isopropylthioxanthone, and benzophenone, more preferably at least one selected from the group consisting of thioxanthone and isopropylthioxanthone, still more preferably isopropylthioxanthone.

When the specified particles include a sensitizer, the specified particles may include a single sensitizer alone or may include two or more sensitizers.

When the specified particles include a sensitizer, the content of the sensitizer relative to the solid content of the specified particles is preferably 0.1 mass % to 20 mass %, more preferably 0.2 mass % to 15 mass %, still more preferably 0.3 mass % to 10 mass %.

The specified particles including a photopolymerization initiator and a sensitizer can be produced by, for example, emulsifying a mixture provided by mixing together an oil-phase component including the polymer P (or a raw material compound for producing the polymer P), a radical-polymerizable monomer, a photopolymerization initiator, and a sensitizer, and an aqueous-phase component.

Photothermal Conversion Agent

When the specified particles include, as the polymerizable monomer, a thermal-polymerizable monomer, the specified particles may include at least one photothermal conversion agent.

The photothermal conversion agent is a compound that absorbs, for example, infrared radiation to generate heat, to polymerize and cure the thermal-polymerizable monomer. Such photothermal conversion agents can be publicly known compounds.

The photothermal conversion agent is preferably an infrared absorbent. Examples of the infrared absorbent include polymethylindolium, indocyanine green, polymethine pigment, croconium pigment, cyanine pigment, merocyanine pigment, squarylium pigment, chalcogenopyryloallylidene pigment, metal thiolate complex pigment, bis(chalcogenopyrylo)polymethine pigment, oxyindolizine pigment, bisaminoallylpolymethine pigment, indolizine pigment, pyrylium pigment, quinoid pigment, quinone pigment, phthalocyanine pigment, naphthalocyanine pigment, azo pigment, azomethine pigment, and carbon black.

Thermosetting Accelerator

When the specified particles include, as the polymerizable monomer, a thermal-polymerizable monomer, the specified particles may include at least one thermosetting accelerator.

The thermosetting accelerator is a compound that catalytically accelerates the thermosetting reaction of the thermal-polymerizable monomer.

Such thermosetting accelerators can be publicly known compounds. The thermosetting accelerator is preferably an acid or a base, or a compound that generates an acid or a base upon heating; examples include carboxylic acid, sulfonic acid, phosphoric acid, aliphatic alcohols, phenol, aliphatic amines, aromatic amines, imidazoles (for example, phenylimidazole and 2-methylimidazole), and pyrazole.

Compound (S)

The specified particles may include at least one compound (S) including a polysiloxane bond and not including the bond U (hereafter, also referred to as "internally added polysiloxane compound (S)").

Even when the polymer P in the specified particles does not include a polysiloxane bond, as long as the specified particles include the internally added polysiloxane compound (S), the effect of improving the rub fastness of the film is provided.

When the polymer P in the specified particles includes a polysiloxane bond and the specified particles include the internally added polysiloxane compound (S), the film has markedly improved rub fastness.

The internally added polysiloxane compound (S) more preferably includes the above-described monovalent polysiloxane group.

The internally added polysiloxane compound (S) may include a polymerizable group.

When the internally added polysiloxane compound (S) includes a polymerizable group, the film can have further improved adhesiveness.

Preferred examples of the polymerizable group that can be included in the internally added polysiloxane compound (S) are the same as the preferred examples of the polymerizable group that can be included in the polymer P.

The internally added polysiloxane compound (S) preferably has a number-average molecular weight (Mn) of 500 to 20000, more preferably 800 to 15000, still more preferably 1000 to 12000.

The following are specific examples of the internally added polysiloxane compound (S); however, the internally added polysiloxane compound (S) is not limited to the following specific examples.

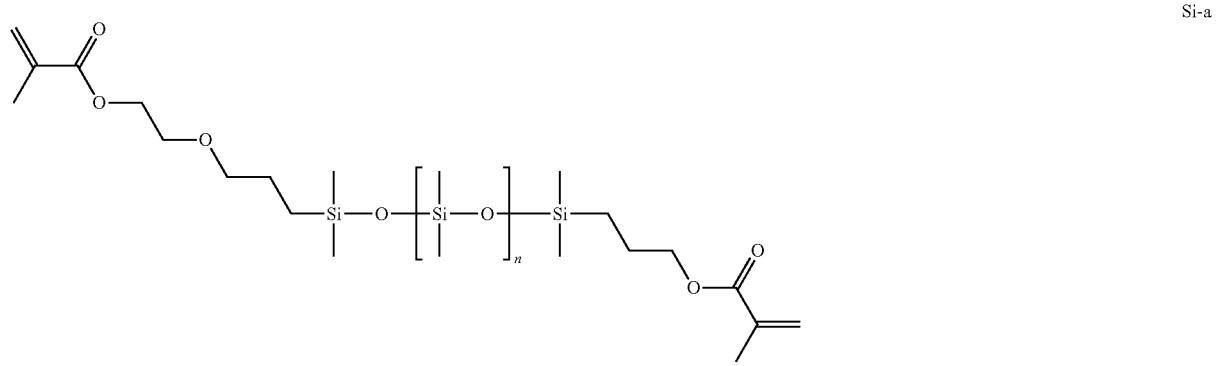

Si-a

Si-b
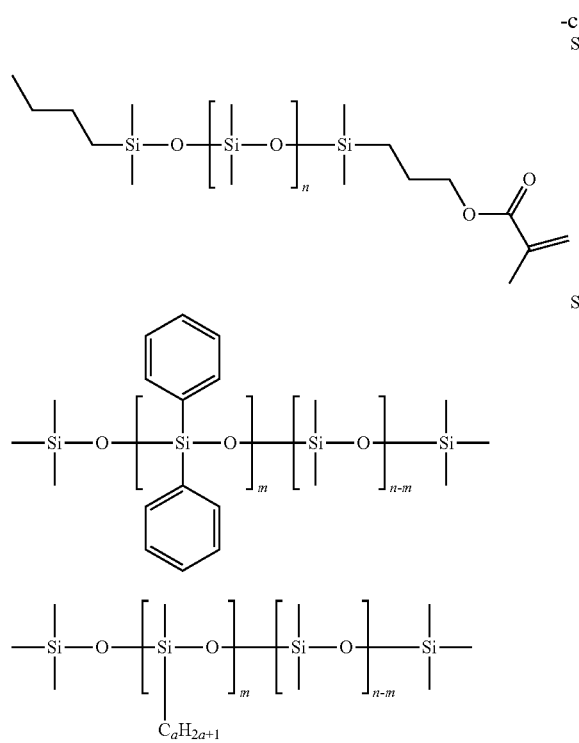

Si-c
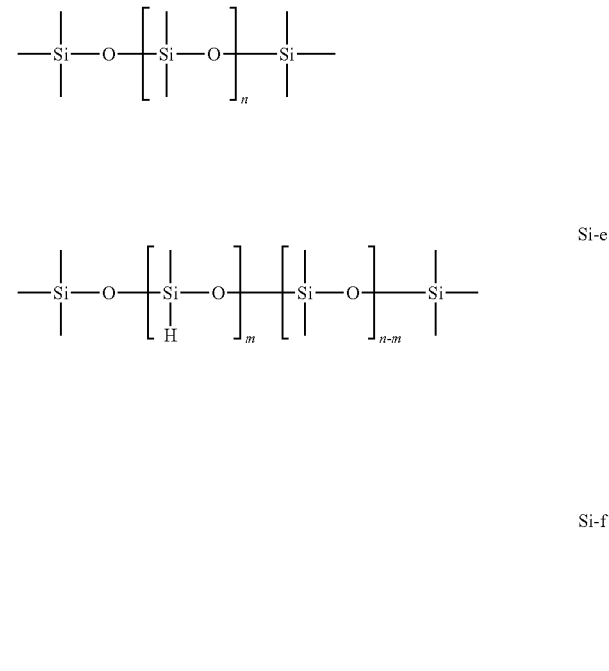

Si-d

Si-e

Si-f

In the specific examples, n have the same definition and preferred examples as in the above-described n in the polysiloxane bond (SB).

In Si-d, Si-e, and Si-f, m represent an integer of 1 to n.

In Si-f, a represents an integer of 2 to 20; a is preferably an integer of 2 to 18.

When the specified particles include the internally added polysiloxane compound (S), the content of the internally added polysiloxane compound (S) relative to the solid content of the specified particles is preferably 0.01 mass % to 20 mass %, more preferably 0.05 mass % to 15 mass %, still more preferably 0.1 mass % to 12 mass %.

Other Component

The specified particles may include, in addition to the above-described components, another component.

Examples of the other component include polymers other than the polymer P.

Aqueous Dispersion

The aqueous dispersion according to the present disclosure contains the above-described specified particles and water.

The aqueous dispersion according to the present disclosure enables formation of a film having high rub fastness and high adhesiveness.

In addition, the aqueous dispersion according to the present disclosure has high dispersion stability of the specified particles due to the action of the hydrophilic groups in the polymer P.

Water

The aqueous dispersion according to the present disclosure contains water.

The water serves as the dispersion medium for the specified particles (dispersoid).

The water content in the aqueous dispersion according to the present disclosure is not particularly limited.

The water content relative to the total amount of the aqueous dispersion is preferably 10 mass % or more, more preferably 20 mass % or more, still more preferably 30 mass % or more, particularly preferably 50 mass % or more.

The water content relative to the total amount of the aqueous dispersion is 99 mass % or less, more preferably 95 mass % or less, still more preferably 90 mass % or less.

Other Component

The aqueous dispersion according to the present disclosure may contain, in addition to the specified particles and water, another component.

For the other component that can be contained in the aqueous dispersion according to the present disclosure, reference can be made to the "Ink" section described later, which is an example of the aqueous dispersion according to the present disclosure.

In the aqueous dispersion according to the present disclosure, the total solid content of the specified particles relative to the total solid content of the aqueous dispersion is preferably 50 mass % or more, more preferably 60 mass % or more, still more preferably 70 mass % or more, still more preferably 80 mass % or more, still more preferably 85 mass % or more.

This provides a film having further improved rub fastness and adhesiveness.

In the aqueous dispersion according to the present disclosure, the total solid content of the specified particles relative to the total amount of the aqueous dispersion is preferably 1 mass % to 50 mass %, more preferably 3 mass % to 40 mass %, still more preferably 5 mass % to 30 mass %.

When the total solid content of the specified particles relative to the total amount of the aqueous dispersion is 1 mass % or more, the film has further improved rub fastness and adhesiveness.

When the total solid content of the specified particles relative to the total amount of the aqueous dispersion is 50 mass % or less, the dispersion stability of the specified particles is further improved.

In the aqueous dispersion, the volume-average dispersion particle size of the specified particles is not particularly limited, but is, from the viewpoint of dispersion stability, preferably 0.01 µm to 10 µm, more preferably 0.01 µm to 5 µm, still more preferably 0.05 µm to 1 µm, still more preferably 0.05 µm to 0.5 µm, still more preferably 0.05 µm to 0.3 µm.

In the present disclosure, "volume-average dispersion particle size" means a value measured by the light scattering method. The light scattering method is performed to measure the volume-average dispersion particle size of the specified particles using LA-960 (HORIBA, Ltd.), for example.

Applications of Aqueous Dispersion

The aqueous dispersion according to the present disclosure is, directly or together with another component, applicable to various applications.

Examples of the applications include inks such as ink jet inks and compositions for forming coating films.

Method for Producing Aqueous Dispersion

The method for producing the aqueous dispersion according to the present disclosure is not particularly limited.

Examples of the method for producing the aqueous dispersion according to the present disclosure include the following production method A and production method B.

Production Method A

The production method A has a step of subjecting an oil-phase component including an organic solvent, the polymer P, and a polymerizable monomer and an aqueous-phase component including water to mixing and emulsification, to thereby obtain an aqueous dispersion of specified particles.

The production method A is suitable as a method for producing an aqueous dispersion of specified particles including an example of the polymer P that is a chain polymer.

In the step of obtaining the aqueous dispersion of specified particles, the above-described oil-phase component and aqueous-phase component are mixed, and the resultant mixture is emulsified, to thereby form specified particles. The formed specified particles function as dispersoid in the aqueous dispersion produced.

The water in the aqueous-phase component functions as a dispersion medium in the aqueous dispersion produced.

Examples of the organic solvent included in the oil-phase component include ethyl acetate and methyl ethyl ketone.

The organic solvent is preferably at least partially removed during the forming process of the specified particles or after formation of the specified particles.

The oil-phase component can include, in addition to the above-described components, for example, a radical polymerization initiator or a sensitizer.

In the case of performing the production method A to produce a photocurable aqueous dispersion, the oil-phase component is prepared so as to include, for example, a radical-polymerizable monomer and a radical polymerization initiator (and a sensitizer as needed).

In the case of performing the production method A to produce a thermosetting aqueous dispersion, the oil-phase component is prepared so as to include, for example, a thermal-polymerizable monomer.

The aqueous-phase component is not particularly limited except that it includes water.

The aqueous-phase component may include a neutralizer for neutralizing at least some of the hydrophilic groups of the polymer P.

Examples of the neutralizer include alkali metal hydroxides (for example, sodium hydroxide and potassium hydroxide) and organic amines (for example, triethylamine).

The aqueous-phase component may include, in addition to water and the neutralizer, another component.

In the production method A, the total amount of the oil-phase component and the aqueous-phase component except for the organic solvent and water corresponds to the total solid content of the specified particles in the aqueous dispersion produced.

For preferred ranges of usage amounts of components that can be used in the production method A, reference can be made to the above-described "specified particle" section. During this reference, in the above-described "specified particle" section, "content" and "total solid content of the specified particles" are respectively replaced by "usage amount" and "total amount of the oil-phase component and the aqueous-phase component except for the organic solvent and water".

In the step of obtaining the aqueous dispersion of specified particles, the process of mixing the oil-phase component and the aqueous-phase component is not particularly limited, but may be, for example, mixing by stirring.

In the step of obtaining the aqueous dispersion of specified particles, the process of emulsification is not particularly limited, but is, for example, emulsification using an emulsifying apparatus such as a homogenizer (for example, a dispersing machine).

In the emulsification, the number of revolutions of the dispersing machine is, for example, 5000 rpm to 20000 rpm, preferably 10000 rpm to 15000 rpm, where rpm is the abbreviation of revolutions per minute.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the step of obtaining the aqueous dispersion of specified particles, emulsification can be performed under heating.

Such emulsification under heating enables more efficient formation of the specified particles.

In addition, the emulsification under heating facilitates, from the mixture, removal of at least partially the organic solvent in the oil-phase component.

In the case of performing emulsification under heating, the heating temperature is preferably 35° C. to 70° C., more preferably 40° C. to 60° C.

The step of obtaining the aqueous dispersion of specified particles may include an emulsification step of emulsifying the mixture (for example, at a temperature of less than 35° C.), and a heating step of heating (for example, at a temperature of 35° C. or more) the emulsion obtained by the emulsification step.

In such an example in which the step of obtaining the aqueous dispersion of specified particles includes the emulsification step and the heating step, particularly in the heating step, the specified particles can be more efficiently formed.

In the example in which the step of obtaining the aqueous dispersion of specified particles includes the emulsification step and the heating step, particularly in the heating step, removal of at least partially the organic solvent in the oil-phase component from the mixture is facilitated.

In the heating step, the heating temperature is preferably 35° C. to 70° C., more preferably 40° C. to 60° C.

In the heating step, the heating time is preferably 6 hours to 50 hours, more preferably 12 hours to 40 hours, still more preferably 15 hours to 35 hours.

The production method A may have, as needed, in addition to the step of obtaining the aqueous dispersion of specified particles, another step.

The other step may be, after the step of obtaining the aqueous dispersion of specified particles, a step of adding another component (such as pigment).

For the other component (such as pigment) added, for example, reference can be appropriately made to the Ink section described later.

Production method B

The production method B has a step of subjecting an oil-phase component including an organic solvent, raw material compounds for the polymer P (for example, a tri- or higher functional isocyanate compound, and a compound having two or more active hydrogen groups), and a polymerizable monomer, and an aqueous-phase component including water to mixing and emulsification, to thereby obtain an aqueous dispersion of specified particles.

The production method B is suitable as the method for producing an aqueous dispersion of specified particles including an example of the polymer P that is a crosslinked polymer (for example, microcapsules).

In the production method B, the oil-phase component includes an organic solvent, raw material compounds for the polymer P, and a polymerizable monomer.

In the case of performing the production method B to produce a photocurable aqueous dispersion, the oil-phase component is prepared so as to include, for example, the raw material compounds for the polymer P, a radical-polymerizable monomer, and a radical polymerization initiator (and, as needed, a sensitizer).

In the case of performing the production method B to produce a thermosetting ink, the oil-phase component is prepared so as to include, for example, the raw material compounds for the polymer P and a thermal-polymerizable monomer.

Ink

The ink according to the present disclosure contains the above-described specified particles and water.

The ink according to the present disclosure is an example of the above-described aqueous dispersion according to the present disclosure.

Examples of the ink according to the present disclosure include ink jet inks and gravure inks, but preferred are ink jet inks.

The ink according to the present disclosure enables formation of a film having high rub fastness and high adhesiveness.

In addition, the ink according to the present disclosure has, due to the action of hydrophilic groups in the polymer P, high dispersion stability for the specified particles.

Water

The ink according to the present disclosure contains water.

Preferred ranges of the water content in the ink according to the present disclosure are the same as the preferred ranges of the water content in the aqueous dispersion according to the present disclosure.

Coloring Agent

The ink according to the present disclosure may be an ink containing at least one coloring agent (what is called "color ink"), or may be an ink not containing coloring agents (what is called "clear ink").

When the ink contains a coloring agent, the coloring agent is preferably contained outside of the specified particles (in other words, the specified particles do not include the coloring agent).

The coloring agent is not particularly limited, and can be appropriately selected from the group consisting of publicly known coloring agents such as pigments, water-soluble dyes, and disperse dyes. Of these, pigments are more preferably included from the viewpoint of having high weather resistance and high color reproducibility.

Such a pigment is not particularly limited, and can be appropriately selected in accordance with the purpose. Examples include publicly known organic pigments and inorganic pigments, and further include resin particles dyed with dyes, and commercially available pigment dispersions and surface-treated pigments (for example, dispersions of pigments in dispersion media such as water, liquid compounds, or insoluble resins, and pigments surface-treated with resins, pigment derivatives, or the like).

Examples of the organic pigments and inorganic pigments include yellow pigments, red pigments, magenta pigments, blue pigments, cyan pigments, green pigments, orange pigments, purple pigments, brown pigments, black pigments, and white pigments.

In such a case of using, as the coloring agent, a pigment, a pigment dispersing agent may be used as needed.

In the case of using, as the coloring agent, a pigment, a self-dispersible dye having hydrophilic groups on the surfaces of the pigment particles may be used as the pigment.

For the coloring agent and the pigment dispersing agent, reference can be appropriately made to Paragraphs 0180 to 0200 of JP2014-040529A and Paragraphs 0122 to 0129 of WO2016/052053A.

When the ink according to the present disclosure contains a coloring agent, the content of the coloring agent relative to the total ink amount is preferably 0.1 mass % to 20 mass %, more preferably 0.5 mass % to 10 mass %, particularly preferably 0.5 mass % to 5 mass %.

Other Component

The ink according to the present disclosure may contain, as needed, in addition to the above-described components, another component.

The other component may be included in the specified particles or may not be included in the specified particles.

Water-Soluble Organic Solvent

The ink according to the present disclosure may contain a water-soluble organic solvent.

When the ink according to the present disclosure contains a water-soluble organic solvent, the ejection performance of the ink from the ink jet head is improved.

The term "water-soluble" means a property in which a substance dried at 105° C. for 2 hours dissolves in an amount of more than 1 g in 100 g of distilled water at 25° C.

When the ink according to the present disclosure contains a water-soluble organic solvent, the content of the water-soluble organic solvent relative to the total ink amount is preferably 0.1 mass % to 10 mass %, more preferably 0.1 mass % to 5 mass %.

Specific examples of the water-soluble organic solvent are as follows.

Alcohols (for example, methanol, ethanol, propanol, isopropanol, butanol, isobutanol, secondary butanol, tertiary butanol, pentanol, hexanol, cyclohexanol, and benzyl alcohol)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol)

Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether)

Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine)

Amides (for example, formamide, N,N-dimethylformamide, and N,N-dimethylacetamide)

Heterocycles (for example, 2-pyrrolidone, N-methyl-2-pyrrolidone, cyclohexylpyrrolidone, 2-oxazolidone, 1,3-dimethyl-2-imidazolidinone, and γ-butyrolactone)

Sulfoxides (for example, dimethyl sulfoxide)

Sulfones (for example, sulfolane)

Others (urea, acetonitrile, acetone, and the like)

The ink according to the present disclosure may contain, as a component that may be included in the specified particles or may not be included in the specified particles, a surfactant, a polymerization inhibitor, or an ultraviolet absorbent, for example.

The ink according to the present disclosure may contain, as needed, outside of the specified particles, a water-soluble polymerizable monomer, a water-soluble photopolymerization initiator, or a water-soluble resin, for example.

For these components, for example, reference can be made to Paragraphs 0134 to 0157 of WO2016/052053A.

Preferred Method for Producing Ink

The method for producing the ink according to the present disclosure is not particularly limited; however, the ink is preferably produced by the above-described method for producing an aqueous dispersion (the production method A or the production method B).

The ink according to the present disclosure may also be produced by, to the aqueous dispersion obtained by the production method A or the production method B, further adding another component such as a pigment or a water-soluble organic solvent, and mixing the aqueous dispersion.

Preferred Properties of Ink

The ink according to the present disclosure set at 25° C. to 50° C. preferably has a viscosity of 3 mPa-s to 15 mPa-s, more preferably 3 mPa-s to 13 mPa-s. In particular, the ink according to the present disclosure set at 25° C. preferably has a viscosity of 50 mPa-s or less. When the ink has a viscosity in such a range, higher ejection stability can be achieved.

Note that the viscosity of the ink is a value measured using a viscometer.

As the viscometer, for example, VISCOMETER TV-22 (Toki Sangyo Co., Ltd.) can be used.

Film-Forming Method

A preferred example of a film-forming method using the above-described aqueous dispersion according to the present disclosure (hereafter, also referred to as "film-forming method X") is as follows.

The film-forming method X includes a step of applying, onto a substrate, the aqueous dispersion according to the present disclosure (hereafter, also referred to as "application step"), and a step of curing the aqueous dispersion applied onto the substrate (hereafter, also referred to as "curing step").

The film-forming method X may include, as needed, another step.

The film-forming method X provides formation of a film having high rub fastness and high adhesiveness to the substrate.

Substrate

The substrate used in the film-forming method X is not particularly limited, may be an impermeable substrate or a permeable substrate, and is preferably an impermeable substrate.

Specifically, in the case of using an aqueous composition to form a film on an impermeable substrate, there is a strong demand for improvement in the rub fastness and the adhesiveness of the film. Thus, in the case of using, as the substrate for the film-forming method X, an impermeable substrate, the demand is satisfied.

The impermeable substrate is a substrate having a water absorption (unit: mass %, measurement time: 24 hours) of less than 10 measured by an ASTM test method according to ASTM D570.

The above-described water absorption of the impermeable substrate is preferably 5 or less.

Examples of the impermeable substrate include:

paper laminated with a plastic (for example, polyethylene, polypropylene, or polystyrene), metal plates (for example, plates of a metal such as aluminum, zinc, or copper), plastic films (for example, films of polyvinyl chloride (PVC: Polyvinyl Chloride) resins, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resins), paper laminated with or vapor-deposited with the above-described metal, plastic films laminated with or vapor-deposited with the above-described metal, and leathers.

Examples of the leathers include natural leathers (also referred to as "real leathers"), and synthetic leathers (for example, PVC (polyvinyl chloride) leather and PU (polyurethane) leather). For leathers, for example, reference can be made to Paragraph 0163 to Paragraph 0165 of JP2009-058750A.

For example, in the case of forming a film on a plastic film or a leather serving as an impermeable substrate (for example, a seat for a vehicle, a bag, a shoe, or a purse), the film is desirably formed to have high rub fastness and high adhesiveness.

Also, in the case of forming a film on a substrate other than leathers and plastic films, the film may be desirably formed to have high rub fastness and high adhesiveness.

The film-forming method according to the present disclosure can satisfy such desires.

The substrate may be surface-treated from the viewpoint of improving the surface energy.

Non-limiting examples of such a surface treatment include corona treatment, plasma treatment, flame treatment, heat treatment, abrasion treatment, light irradiation treatment (UV treatment), and flame treatment.

Application Step

The application step is a step of applying, onto a substrate, the aqueous dispersion according to the present disclosure.

As the process of applying the aqueous dispersion, publicly known application processes such as a coating process, an immersion process, a gravure printing process, and an ink jet process are applicable without particular limitations.

The application step may include a heat-drying step of heat-drying the aqueous dispersion according to the present disclosure applied onto the substrate.

In the case of using, as the aqueous dispersion according to the present disclosure, the above-described thermosetting aqueous dispersion, the heat-drying step may be omitted and a curing step B described later may be performed to dry and cure the aqueous dispersion.

Examples of heating in the heat-drying step include using heating means to heat the aqueous dispersion applied onto the substrate.

The heating means for the heat-drying is not particularly limited, and examples include a heating drum, hot air, an infrared lamp, an infrared LED, an infrared heater, a heating oven, a heating plate, an infrared laser, and an infrared dryer.

In the heat-drying, the heating temperature is preferably 40° C. or more, more preferably 40° C. to 200° C., still more preferably 45° C. to 100° C., still more preferably 50° C. to 80° C., still more preferably 55° C. to 70° C.

The heating temperature means the temperature of the ink on the substrate, and can be measured with a thermograph using an infrared thermography apparatus H2640 (manufactured by Nippon Avionics Co., Ltd.).

The heating time can be appropriately set in accordance with the heating temperature, the composition of the ink, and the printing speed, for example. The heating time is preferably 5 seconds or more, more preferably 5 seconds to 20 minutes, more preferably 10 seconds to 10 minutes, still more preferably 20 seconds to 5 minutes.

Curing Step

The curing step in the film-forming method X is a step of curing the aqueous dispersion applied onto the substrate.

This curing step causes, in the aqueous dispersion applied onto the substrate, the polymerization reaction of the polymerizable monomer to proceed. This provides a film having high rub fastness and high adhesiveness (hereafter, also referred to as "cured film").

In the film-forming method X, in the case of using a photocurable aqueous dispersion (for example, a photocurable ink), the curing step is preferably a curing step A of irradiating, with light, the aqueous dispersion applied onto the substrate, to photocure the aqueous dispersion.

In the film-forming method X, in the case of using a thermosetting aqueous dispersion (for example, a thermosetting ink), the curing step is preferably a curing step B of applying heat to the aqueous dispersion applied onto the substrate, to heat-cure the aqueous dispersion.

In the film-forming method X, in the case of using a thermosetting ink, a heat-drying step of heat-drying the aqueous dispersion and the curing step B of heat-curing the aqueous dispersion may be individually provided, or a one-time curing step B of performing both of heat-drying and heat-curing of the aqueous dispersion may be provided.

Curing Step A

The curing step A is a step of irradiating, with light, the aqueous dispersion on the substrate, to thereby photocure the aqueous dispersion.

Examples of the light usable in the curing step A include ultraviolet radiation (UV light), visible light, and an electron beam; of these, preferred is UV light.

The light usable in the curing step A preferably has a peak wavelength of 200 nm to 405 nm, more preferably 220 nm to 390 nm, still more preferably 220 nm to 385 nm. The peak wavelength is also preferably 200 nm to 310 nm, also preferably 200 nm to 280 nm.

In the curing step A, the energy of light used for irradiation of the aqueous dispersion on the substrate is preferably 100 mJ/cm$^2$ to 4000 mJ/cm$^2$, more preferably 200 mJ/cm$^2$ to 3000 mJ/cm$^2$, still more preferably 300 mJ/cm$^2$ to 2500 mJ/cm$^2$.

In the curing step A, the illuminance at the exposure surface irradiated with light is, for example, 10 mW/cm$^2$ to 2000 mW/cm$^2$, preferably 20 mW/cm$^2$ to 1000 mW/cm$^2$.

In the curing step A, as the source of generating light, there are widely known sources such as mercury lamps, metal halide lamps, UV fluorescent lights, gas lasers, and solid-state lasers.

These light sources listed as examples can be replaced by semiconductor ultraviolet light-emitting devices, which is industrially and environmentally very effective.

Of the semiconductor ultraviolet light-emitting devices, LEDs (Light Emitting Diodes) and LD (Laser Diodes) have small sizes, long longevity, and high efficiency, are less expensive, and hence regarded as promising light sources.

A preferred light source is a metal halide lamp, an ultra-high pressure mercury lamp, a high pressure mercury lamp, a medium pressure mercury lamp, a low pressure mercury lamp, an LED, or a violet laser.

Of these, in the case of using both of a sensitizer and a photopolymerization initiator, more preferred are an ultra-high pressure mercury lamp configured to emit light of a wavelength of 365 nm, 405 nm, or 436 nm, a high pressure mercury lamp configured to emit light of a wavelength of 365 nm, 405 nm, or 436 nm, and an LED configured to emit light of a wavelength of 355 nm, 365 nm, 385 nm, 395 nm, or 405 nm, and most preferred is an LED configured to emit light of a wavelength of 355 nm, 365 nm, 385 nm, 395 nm, or 405 nm.

In the curing step A, the time for light irradiation of the aqueous dispersion is, for example, 0.01 seconds to 120 seconds, preferably 0.1 seconds to 90 seconds.

For irradiation conditions and a basic irradiation process, the irradiation conditions and the irradiation process disclosed in JP1985-132767A (JP-S60-132767A) are similarly applicable.

When the aqueous dispersion having been heat-dried is irradiated with light, from heat-drying of the aqueous dispersion, after the lapse of a predetermined time (for example, 0.01 seconds to 120 seconds, preferably 0.01 seconds to 60 seconds), irradiation with light is preferably performed.

Curing step B

The curing step B is a step of applying heat to the aqueous dispersion on the substrate, to thereby heat-cure the aqueous dispersion.

In the curing step B, for conditions of application of heat, reference can be made to the above-described conditions of heat-drying in the heat-drying step.

Image-Forming Method

A preferred example of an image-forming method using the above-described ink according to the present disclosure (hereafter, also referred to as "image-forming method Y") is as follows.

The image-forming method Y includes a step of applying, onto a substrate, the ink according to the present disclosure by an ink jet process (hereafter, also referred to as "application step"), and a step of curing the ink applied onto the substrate (hereafter, also referred to as "curing step").

The image-forming method Y may include, as needed, another step.

The image-forming method Y provides formation of an image having high rub fastness and high adhesiveness to the substrate.

The image-forming method Y is an example of the above-described film-forming method X.

A preferred example of the image-forming method Y is the same as the above-described preferred example of the film-forming method X except that, in the application step, the ink according to the present disclosure is applied by an ink jet process.

The application of the ink by the ink jet process can be performed using a publicly known ink jet recording apparatus.

The ink jet recording apparatus is not particularly limited, and a publicly known ink jet recording apparatus that can achieve the target resolution can be appropriately selected and used.

The ink jet recording apparatus is, for example, an apparatus including an ink supply system, a temperature sensor, and heating means.

The ink supply system is composed of, for example, a source tank including the ink according to the present disclosure, supply pipes, an ink supply tank disposed immediately before an ink jet head, a filter, and a piezoelectric ink jet head. The piezoelectric ink jet head can be operated so as to eject multi-size dots of preferably 1 pl to 100 pl, more preferably 8 pl to 30 pl, preferably at a resolution of 320 dpi (dot per inch)×320 dpi to 4000 dpi×4000 dpi, more preferably 400 dpi×400 dpi to 1600 dpi×1600 dpi, still more preferably 720 dpi×720 dpi. Note that dpi means the number of dots per 2.54 cm (1 inch).

EXAMPLES

Hereinafter, the present invention will be specifically described with reference to Examples; however, the present invention is not limited to the following Examples.

Hereinafter, "parts" represent parts by mass unless otherwise specified.

Example 1: Photocurable Ink

Synthesis of Polymer P (Example 1)

Into a three-neck flask,
as a hydrophilic-group-introducing compound (in Table 1-1, "Hydrophilic group"), 2,2-dimethylolpropionic acid (DMPA) (5.74 g),
as a fluorinated-hydrocarbon-group-introducing compound (in Table 1-1, "Fluorinated hydrocarbon"), F-1 (3.1 g),
as an isocyanate compound (in Table 1-1, "NCO"), HMDI (41.32 g),
as a diol compound (in Table 1-1, "Diol"), Compound (8) (11.89 g), and
ethyl acetate (62.05 g)
were charged and heated at 70° C.

To this, 0.124 g of NEOSTANN U-600 (manufactured by Nitto Kasei Co., Ltd., inorganic bismuth catalyst; hereafter, also referred to as "U-600") was added, and stirring was performed at 70° C. for 5 hours.

Subsequently, to this, isopropyl alcohol (82.7 g) was added, and stirring was performed at 70° C. for 3 hours. After the stirring for 3 hours, the reaction solution was left to cool to room temperature, and subsequently ethyl acetate was used to adjust the concentration, to thereby obtain a 30 mass % solution of the polymer P (solvent: mixed solution of ethyl acetate/isopropyl alcohol).

The polymer P has a Mw of 15000 (refer to Table 1-1), and has an acid value of 0.69 mmol/g.

Preparation of Aqueous Dispersion of Specified Particles

Preparation of Oil-Phase Component

The 30 mass % solution of the polymer P (66.66 g),
as a photopolymerizable monomer, SR833S (14.15 g),
as a photopolymerizable monomer, GPO3A (14.15 g),
as a photopolymerization initiator, IRGACURE (registered trademark) 819 (1.5 g),
as a sensitizer, ITX (isopropylthioxanthone) (0.25 g), and
ethyl acetate (36.66 g)
were mixed together and stirred at room temperature for 30 minutes, to obtain an oil-phase component.

SR833S is a bifunctional radical-polymerizable monomer, specifically tricyclodecanedimethanol diacrylate (molecular weight: 304).

GPO3A is a trifunctional radical-polymerizable monomer, specifically a compound below (molecular weight: 470).

IRGACURE (registered trademark) 819 is an acylphosphine oxide-based radical polymerization initiator, specifically bis(2,4,6-trimethylbenzoyl)-phenylphosphine oxide.

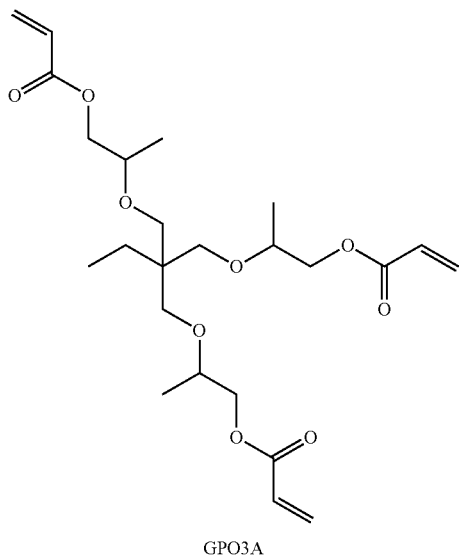 [SMILES: C=CC(=O)OCC(C)OCC(CC)(COC(C)COC(=O)C=C)COC(C)COC(=O)C=C]

GPO3A

Preparation of Aqueous-Phase Component

Distilled water (140 g) and sodium hydroxide serving as a neutralizer were mixed together and stirred for 15 minutes to thereby prepare an aqueous-phase component.

The usage amount of sodium hydroxide serving as the neutralizer was adjusted such that, in the produced particles, the degree of neutralization became 90%.

Preparation of Aqueous Dispersion of Specified Particles

The oil-phase component and the aqueous-phase component were mixed together and the resultant mixture was emulsified at room temperature using a homogenizer at 12000 rpm for 10 minutes, to obtain an emulsion.

The obtained emulsion was added to distilled water (60 g); the resultant liquid was heated to 50° C., and stirred at 50° C. for 5 hours, to thereby drive off, from the liquid, ethyl acetate.

The liquid from which ethyl acetate has been driven off was diluted with distilled water so as to have a solid content of 20 mass %, to thereby obtain an aqueous dispersion of specified particles.

The specified particles were found to have a volume-average dispersion particle size of 150 nm.

In Tables 1-1 and 1-2, "-" mean that the corresponding components are not contained (the same applies to Tables 2-1 and 2-2 and the subsequent Tables).

In Table 1-2, in the "Photopolymerization initiator+sensitizer" column, "Y" means that the particles contain a photopolymerization initiator and a sensitizer (the same applies to Table 2-2 and a subsequent Table).

Preparation of Photocurable Ink

The components of the following composition were mixed together to prepare a photocurable ink. This photocurable ink is also an example of the aqueous dispersion of specified particles.

Composition of photocurable ink
The above-described aqueous dispersion of specified particles: 82 parts
Pigment dispersion liquid (Pro-jet Cyan APD1000 (manufactured by FUJIFILM Imaging Colorants), pigment concentration: 14 mass %): 13 parts
Fluorosurfactant (manufactured by E. I. du Pont de Nemours and Company, Capstone FS-31, solid content: 25 mass %): 0.3 parts
2-Methylpropanediol: 4.7 parts

Evaluations

The photocurable ink obtained above was subjected to the following evaluations.

The results will be described in Table 1-2.

Rub Fastness (Dry)

The above-described ink stored at room temperature within 1 day from preparation was applied onto a substrate, to thereby form a coating film having a thickness of 12 μm on the substrate.

The substrate employed was a polyvinyl chloride (PVC) sheet ("AVERY (registered trademark) 400 GLOSS WHITE PERMANENT" manufactured by AVERY DENNISON CORPORATION).

The application was performed using the No. 2 bar of K Hand Coater manufactured by RK PRINT COAT INSTRUMENTS Ltd.

Subsequently, the coating film was dried at 60° C. for 3 minutes.

The dried coating film was irradiated with ultraviolet radiation (UV), to thereby cure the coating film, to obtain a cyan cured film.

The irradiation with ultraviolet radiation (UV) was performed using an experimental UV mini conveyor apparatus CSOT (manufactured by GS Yuasa Power Supply Ltd.) equipped with, as the exposure light source, an ozoneless metal halide lamp MAN250L, and set at a conveyor speed of 35 m/min and at an exposure intensity of 2.0 W/cm².

The cured film formed on the PVC sheet was subjected to a rubbing test under the following conditions. As the canvas, a dry canvas was used.

Testing apparatus: abrasion resistance testing machine for paperboard (JIS P-8136) from Nihon T.M.C. Corporation
Type of canvas: canvas No. 6 (manufactured by TAKEYARI CO., LTD.)
Number of rubbing: 500 times
Load: 500 gf After the rubbing test, the density of the cyan transferred onto the canvas (hereafter, referred to as "transfer OD") was measured with a Spectrophotometer CM-25cG (manufactured by KONICA MINOLTA JAPAN, INC.), and evaluated in accordance with evaluation ranks below and in terms of rub fastness (dry) of the cured film. Of the following evaluation ranks, A is the highest rank in terms of the rub fastness (dry) of the cured film.

Evaluation Ranks of Rub Fastness (Dry)

A: The transfer OD was 0 or more and less than 0.03.
B: The transfer OD was 0.03 or more and less than 0.1.

C: The transfer OD was 0.1 or more and less than 0.2.
D: The transfer OD was 0.2 or more.

Rub Fastness (Water)

The same evaluation as in Rub fastness (dry) was performed except that the dry canvas was replaced by a canvas moistened with water.

Rub Fastness (IPA)

The same evaluation as in Rub fastness (dry) was performed except that the dry canvas was replaced by a canvas moistened with isopropyl alcohol (IPA).

Adhesiveness of Cured Film

As in the above-described formation of the cured film in the evaluation of Rub fastness (dry), a cured film was formed.

The obtained cured film was subjected to a cross-hatch test in accordance with ISO2409 (2013) (cross-cut method), and evaluated in accordance with evaluation ranks below and in terms of adhesiveness of the cured film to a PS (polystyrene) substrate.

In this cross-hatch test, the cutting pitch was set to 1 mm, and a lattice of 25 squares having 1 mm sides was formed.

Of the evaluation ranks below, A is the highest rank in terms of the adhesiveness of the cured film.

In the evaluation ranks below, the flaking square ratios (%) are values determined by the following formula. In the following formula, the total number of squares is 25.

Flaking square ratio (%) = [(Number of flaking squares)/(Total number of squares)] × 100

Evaluation Ranks of Adhesiveness of Cured Film

A: The flaking square ratio (%) was 0% or more and 5% or less.
B: The flaking square ratio (%) was more than 5% and 15% or less.
C: The flaking square ratio (%) was more than 15% and 35% or less.
D: The flaking square ratio (%) was more than 35%.

Ejection Performance of Ink

The above-described ink stored at room temperature within 1 day from preparation was ejected through the head of an ink jet printer (manufactured by Roland DG Corporation, SP-300V) for 30 minutes, and then the ejection was terminated.

After the lapse of 5 minutes from the termination of ejection, the ink was again ejected through the head onto the substrate, to form 5 cm×5 cm solid images.

The images were visually inspected for missing dots due to, for example, nozzles turned into a non-ejection state, and evaluated in terms of ink ejection performance and in accordance with the evaluation ranks below.

Of the following evaluation ranks, A is the highest rank in terms of the ink ejection performance.

Evaluation Ranks of Ejection Performance

A: Missing dots due to, for example, nozzles turned into a non-ejection state were not observed and good images were obtained.
B: A small number of missing dots due to, for example, nozzles turned into a non-ejection state were observed, but they did not cause practical problems.
C: Missing dots due to, for example, nozzles turned into a non-ejection state occurred and the images were not practically usable.
D: The ink was not ejected through the head.

Preservation Stability of Ink

The above-described ink stored at room temperature within 1 day from preparation was sealed in a container, and left at 60° C. for 2 weeks.

The ink left for 2 weeks was evaluated as in the above-described evaluation of ejection performance, and evaluated in accordance with the same evaluation ranks and in terms of preservation stability of the ink.

Of the evaluation ranks, A is the highest rank in terms of the preservation stability of the ink.

Examples 2 to 5

The same procedures as in Example 1 were performed except for the following points.

The results will be described in Table 1-2.

Points Changed from Example 1

F-1 used for the synthesis of the polymer P (Example 1) and serving as a fluorinated-hydrocarbon-group-introducing compound (in Table 1-1, "Fluorinated hydrocarbon") was changed to compounds described in Table 1-1.

The content (mass %) of the fluorinated-hydrocarbon-group-introducing compound relative to the total amount of the polymer P was adjusted so as to be values in the "Amount (mass %)" column in Fluorinated hydrocarbon in Table 1-1.

Specifically,
a ratio [Number of moles of hydrophilic-group-introducing compound/Total mass of polymer P-forming compounds (specifically, isocyanate compound, hydrophilic-group-introducing compound, fluorinated-hydrocarbon-group-introducing compound, and diol compound)] was not changed (in other words, the acid value (mmol/g) was not changed), and
a ratio [(Total number of moles of hydrophilic-group-introducing compound, fluorinated-hydrocarbon-group-introducing compound, and diol compound)/Number of moles of isocyanate compound] was not changed, but
a ratio [Mass of fluorinated-hydrocarbon-group-introducing compound/Total mass of polymer P-forming compounds] was adjusted.

Example 17

The same procedures as in Example 1 were performed except that the polymer P (Example 1) was changed to a polymer P synthesized as described below (Example 17).

The results will be described in Table 1-2.

Synthesis of Polymer P (Example 17)

Into a three-neck flask,
as a hydrophilic-group-introducing compound (in Table 1-1, "Hydrophilic group"), DMPA (6.2 g),
as a polysiloxane-bond-introducing compound (in Table 1-1, "Polysiloxane bond"), Si-3 (Mn: 1000) (manufactured by INC CORPORATION, SILAPLANE (registered trademark) FM-DA11) (3.35 g),
as an isocyanate compound (in Table 1-1, "NCO"), HMDI (41.32 g),
as a diol compound (in Table 1-1, "Diol"), Compound (8) (16.11 g), and ethyl acetate (66.96 g) were charged, and heated to 70° C.

To this, 0.133 g of NEOSTANN U-600 (manufactured by Nitto Kasei Co., Ltd., inorganic bismuth catalyst; hereafter, also referred to as "U-600") was added, and stirring at 70° C. was performed for 5 hours.

Subsequently, to this, isopropyl alcohol (89.28 g) was added and stirring at 70° C. was performed for 3 hours. After the stirring for 3 hours, the reaction solution was left to cool to room temperature, and subsequently ethyl acetate was used to adjust the concentration, to thereby obtain a 30 mass % solution of the polymer P (solvent: mixed solution of ethyl acetate/isopropyl alcohol).

Examples 6 to 16 and 18 to 23

The same procedures as in Example 17 were performed except for the following points.
The results will be described in Table 1-2.

Points Changed from Example 17

Si-3 (Mn: 1000) used in the synthesis of the polymer P (Example 17) and serving as the polysiloxane-bond-introducing compound (in Table 1-1, "Polysiloxane bond") was changed to compounds in Table 1-1.
As Si-1 (Mn: 1000), SILAPLANE (registered trademark) FM-4411 manufactured by INC CORPORATION was used.
As Si-1 (Mn: 5000), SILAPLANE (registered trademark) FM-4421 manufactured by INC CORPORATION was used.
As Si-1 (Mn: 10000), SILAPLANE (registered trademark) FM-4425 manufactured by INC CORPORATION was used.
As Si-2 (Mn: 1000), SILAPLANE (registered trademark) FM-3311 manufactured by INC CORPORATION was used.
As Si-3 (Mn: 5000), SILAPLANE (registered trademark) FM-DA21 manufactured by INC CORPORATION was used.
As Si-3 (Mn: 11000), X-22-176DX manufactured by Shin-Etsu Chemical Co., Ltd. was used.
The content (mass %) of the polysiloxane-bond-introducing compound relative to the total amount of the polymer P was changed as described in the "Amount (mass %)" column in Polysiloxane in Table 1-1.
Specifically,
a ratio [Number of moles of hydrophilic-group-introducing compound/Total mass of polymer P-forming compounds (specifically, isocyanate compound, hydrophilic-group-introducing compound, polysiloxane-bond-introducing compound, and diol compound)] was not changed (in other words, the acid value (mmol/g) was not changed) and
a ratio [(Total number of moles of hydrophilic-group-introducing compound, polysiloxane-bond-introducing compound, and diol compound)/Number of moles of isocyanate compound]was not changed, but
a ratio [Mass of polysiloxane-bond-introducing compound/Total mass of polymer P-forming compound] was changed.

As described in Table 1-1, in the cases of using Si-1 and Si-2, divalent polysiloxane groups are introduced into the main chains of the polymers P; in the cases of using Si-3, monovalent polysiloxane groups are introduced into graft chains of the polymers P.

Examples 24 to 31

The same procedures as in Example 17 were performed except for the following points.
The results will be described in Table 1-2.

Points Changed from Example 17

The combination of the isocyanate compound, the diol compound, and the polysiloxane-bond-introducing compound used in the synthesis of the polymer P (Example 17) was changed as described in Table 1-1. The amounts of the components were adjusted so as not to change the acid value (mmol/g) and a ratio [(Total number of moles of hydrophilic-group-introducing compound, polysiloxane-bond-introducing compound, and diol compound)/Number of moles of isocyanate compound].
A portion (10 g) of the diol compound (in Table 1-1, "Diol") was replaced by a polymerizable-group-introducing compound (in Table 1-1, "Polymerizable group").

Examples 32 to 36

The same procedures as in Example 24 were performed except for the following point.
The results will be described in Table 2-2.

Point Changed from Example 24

In the synthesis of the polymer P, the reaction time from addition of NEOSTANN U-600 was changed so as to change Mw of the polymer P as described in Table 2-1.

Examples 37 to 39

The same procedures as in Example 24 were performed except for the following points.
The results will be described in Table 2-2.

Points changed from Example 24

In the preparation of the oil-phase component, 5 g of the photopolymerizable monomer SR833 S (14.15 g) was changed to an internally added polysiloxane compound (S) described in Table 2-2. As a result, the specified particles contained the internally added polysiloxane compound (S).
The details of such internally added polysiloxane compounds (S) are as follows.
Si-a: Mn: 1000, manufactured by INC CORPORATION, SILAPLANE (registered trademark) FM-0711
Si-d: manufactured by Momentive Performance Materials Inc., TSF437 (kinematic viscosity: 22 cSt (25° C.))

Si-f: manufactured by Momentive Performance Materials Inc., XF42-A3161 (kinematic viscosity: 50 cSt (25° C.))

Examples 40 and 41

The same procedures as in Examples 37 and 38 were performed except that, in the synthesis of the polymer P, Si-3 (Mn: 11000) serving as the polysiloxane-bond-introducing compound and Compound (8) serving as the diol compound were changed to Compound (24) serving as the diol compound in an amount of the same number of moles as with the total number of moles of Si-3 and Compound (8). The amounts of the components were adjusted so as not to change the acid value (mmol/g) and a ratio [(Total number of moles of hydrophilic-group-introducing compound, polysiloxane-bond-introducing compound, and diol compound)/ Number of moles of isocyanate compound].

Examples 42 and 43

The same procedures as in Example 24 were performed except that, in the synthesis of the polymer P, the combination of the hydrophilic-group-introducing compound, the isocyanate compound, and the diol compound was changed as described in Table 2-1. The amounts of the components were adjusted so as not to change the acid value (mmol/g) and a ratio [(Total number of moles of hydrophilic-group-introducing compound, polysiloxane-bond-introducing compound, and diol compound)/Number of moles of isocyanate compound].

The results will be described in Table 2-2.

Comparative Example 1

The same procedures as in Example 1 were performed except that the polymer P (Example 1) was changed to Comparative polymer (specifically, an acrylic polymer not including the bond U) synthesized as described below.

The results will be described in Table 2-2.

Synthesis of Comparative Polymer (Comparative Example 1; Acrylic Polymer)

Into a three-neck flask, ethyl acetate (50 g) was charged and heated to 80° C. Into an Erlenmeyer flask, methacrylic acid (MAA) (9.28 g), Si-b (Mn: 10000) being a compound including a polysiloxane bond and a polymerizable group (manufactured by JNC CORPORATION, SILAPLANE (registered trademark) FM-0725) (7.82 g), methyl methacrylate (MMA) (139.2 g), V-601 (initiator manufactured by FUJIFILM Wako Pure Chemical Corporation; the same applies to the descriptions below) (3.4 g), and ethyl acetate (106.3 g) were charged and stirred, to obtain a monomer solution.

The obtained monomer solution was added dropwise over 2 hours to ethyl acetate heated to 80° C. in the three-neck flask. After completion of the dropwise addition, V-601 (0.5 g) was further added, and stirring was further performed at 80° C. for 3 hours. After the stirring for 3 hours, the reaction solution was left to cool to room temperature, and subsequently ethyl acetate was used to adjust the concentration, to thereby obtain a 30 mass % solution of Comparative polymer (specifically, an acrylic polymer not including the bond U).

Comparative Example 2

The same procedures as in Example 28 were performed except that, in the synthesis of the polymer P, the hydrophilic-group-introducing compound (Si-3) was replaced by Compound (24) in an amount of the same number of moles as in the hydrophilic-group-introducing compound (Si-3) (in other words, Si-3 was not used).

The results will be described in Table 2-2.

Comparative Example 3

The same procedures as in Comparative Example 2 were performed except that, in the composition of the photocurable ink, 0.5 parts of the aqueous dispersion (82 parts) of the comparative particles was replaced by KP-109 (silicone additive manufactured by Shin-Etsu Chemical Co., Ltd.) serving as an externally added polysiloxane compound. In other words, to the outside of the particles in the ink, KP-109 was externally added.

The results will be described in Table 2-2.

Comparative Examples 4 to 6

The same procedures were respectively performed as in Examples 24, 29, and 30 except that, in the preparation of the aqueous dispersion of the specified particles, the oil-phase component was prepared so as not to contain a photopolymerizable monomer, a photopolymerization initiator, or a sensitizer.

The results will be described in Table 2-2.

TABLE 1-1

| | | | | | Specified particles Polymer P | | | | | | |
|---|---|---|---|---|---|---|---|---|---|---|---|
| | Hydrophilic group | NCO (for forming bond U) | Diol | Polysiloxane | | | | Fluorinated hydrocarbon | | Polymerizable group | Mw |
| | | | | Type | Mn | Amount (mass %) | Monovalent or divalent | Type | Amount (mass %) | | |
| Example 1 | DMPA | HMDI | (8) | — | — | — | — | F-1 | 5.0 | — | 15000 |
| Example 2 | DMPA | HMDI | (8) | — | — | — | — | F-2 | 5.0 | — | 15000 |
| Example 3 | DMPA | HMDI | (8) | — | — | — | — | F-4 | 5.0 | — | 15000 |
| Example 4 | DMPA | HMDI | (8) | — | — | — | — | F-6 | 5.0 | — | 15000 |
| Example 5 | DMPA | HMDI | (8) | — | — | — | — | F-8 | 5.0 | — | 15000 |
| Example 6 | DMPA | HMDI | (8) | Si-1 | 1000 | 5.0 | Divalent | — | — | — | 15000 |
| Example 7 | DMPA | HMDI | (8) | Si-2 | 1000 | 5.0 | Divalent | — | — | — | 15000 |
| Example 8 | DMPA | HMDI | (8) | Si-1 | 1000 | 0.01 | Divalent | — | — | — | 15000 |
| Example 9 | DMPA | HMDI | (8) | Si-1 | 1000 | 0.1 | Divalent | — | — | — | 15000 |
| Example 10 | DMPA | HMDI | (8) | Si-1 | 1000 | 2.5 | Divalent | — | — | — | 15000 |
| Example 11 | DMPA | HMDI | (8) | Si-1 | 1000 | 10.0 | Divalent | — | — | — | 15000 |
| Example 12 | DMPA | HMDI | (8) | Si-1 | 1000 | 20.0 | Divalent | — | — | — | 15000 |

TABLE 1-1-continued

| | Specified particles Polymer P | | | | | | | | | |
|---|---|---|---|---|---|---|---|---|---|---|
| | Hydro-philic group | NCO (for forming bond U) | Diol | Polysiloxane | | | | Fluorinated hydrocarbon | | Polymerizable group | Mw |
| | | | | Type | Mn | Amount (mass %) | Monovalent or divalent | Type | Amount (mass %) | | |
| Example 13 | DMPA | HMDI | (8) | Si-1 | 1000 | 30.0 | Divalent | — | — | — | 15000 |
| Example 14 | DMPA | HMDI | (8) | Si-1 | 1000 | 35.0 | Divalent | — | — | — | 15000 |
| Example 15 | DMPA | HMDI | (8) | Si-1 | 5000 | 5.0 | Divalent | — | — | — | 15000 |
| Example 16 | DMPA | HMDI | (8) | Si-1 | 10000 | 5.0 | Divalent | — | — | — | 15000 |
| Example 17 | DMPA | HMDI | (8) | Si-3 | 1000 | 5.0 | Monovalent | — | — | — | 15000 |
| Example 18 | DMPA | HMDI | (8) | Si-3 | 5000 | 5.0 | Monovalent | — | — | — | 15000 |
| Example 19 | DMPA | HMDI | (8) | Si-3 | 11000 | 5.0 | Monovalent | — | — | — | 15000 |
| Example 20 | DMPA | HMDI | (8) | Si-3 | 11000 | 1.0 | Monovalent | — | — | — | 15000 |
| Example 21 | DMPA | HMDI | (8) | Si-3 | 11000 | 2.5 | Monovalent | — | — | — | 15000 |
| Example 22 | DMPA | HMDI | (8) | Si-3 | 11000 | 5.0 | Monovalent | — | — | — | 15000 |
| Example 23 | DMPA | HMDI | (8) | Si-3 | 11000 | 10.0 | Monovalent | — | — | — | 15000 |
| Example 24 | DMPA | HMDI | (8) | Si-3 | 11000 | 5.0 | Monovalent | — | — | (26) | 15000 |
| Example 25 | DMPA | HMDI | (4) | Si-3 | 11000 | 5.0 | Monovalent | — | — | (26) | 15000 |
| Example 26 | DMPA | HMDI | (18) | Si-3 | 11000 | 5.0 | Monovalent | — | — | (26) | 15000 |
| Example 27 | DMPA | HMDI | (23) | Si-3 | 11000 | 5.0 | Monovalent | — | — | (26) | 15000 |
| Example 28 | DMPA | HMDI | (24) | Si-3 | 11000 | 5.0 | Monovalent | — | — | (26) | 15000 |
| Example 29 | DMPA | HDI | (18) | Si-3 | 11000 | 5.0 | Monovalent | — | — | (26) | 15000 |
| Example 30 | DMPA | HDI | (24) | Si-3 | 11000 | 5.0 | Monovalent | — | — | (26) | 15000 |
| Example 31 | DMPA | HDI | (24) | Si-5 | 11000 | 5.0 | Monovalent | — | — | (26) | 15000 |

TABLE 1-2

| | Specified particles | | | | | Externally added polysiloxane compound |
|---|---|---|---|---|---|---|
| | Photopolymerization monomer | Photopolymerizable monomer | Photopolymerizable initiator + sensitizer | Internally added polysiloxane compound (S) | Polysiloxane amount in particles (mass %) | |
| Example 1 | SR833S | GPO3A | Y | — | 0.0 | — |
| Example 2 | SR833S | GPO3A | Y | — | 0.0 | — |
| Example 3 | SR833S | GPO3A | Y | — | 0.0 | — |
| Example 4 | SR833S | GPO3A | Y | — | 0.0 | — |
| Example 5 | SR8335 | GPO3A | Y | — | 0.0 | — |
| Example 6 | SR8335 | GPO3A | Y | — | 2.0 | — |
| Example 7 | SR8335 | GPO3A | Y | — | 2.0 | — |
| Example 8 | SR8335 | GPO3A | Y | — | 0.004 | — |
| Example 9 | SR8335 | GPO3A | Y | — | 0.02 | — |
| Example 10 | SR8335 | GPO3A | Y | — | 1.0 | — |
| Example 11 | SR8335 | GPO3A | Y | — | 4.0 | — |
| Example 12 | SR8335 | GPO3A | Y | — | 8.0 | — |
| Example 13 | SR8335 | GPO3A | Y | — | 12.0 | — |
| Example 14 | SR8335 | GPO3A | Y | — | 14.0 | — |
| Example 15 | SR8335 | GPO3A | Y | — | 2.0 | — |
| Example 16 | SR8335 | GPO3A | Y | — | 2.0 | — |
| Example 17 | SR8335 | GPO3A | Y | — | 2.0 | — |
| Example 18 | SR8335 | GPO3A | Y | — | 2.0 | — |
| Example 19 | SR8335 | GPO3A | Y | — | 2.0 | — |
| Example 20 | SR8335 | GPO3A | Y | — | 0.4 | — |
| Example 21 | SR8335 | GPO3A | Y | — | 1.0 | — |
| Example 22 | SR8335 | GPO3A | Y | — | 2.0 | — |
| Example 23 | SR8335 | GPO3A | Y | — | 4.0 | — |
| Example 24 | SR8335 | GPO3A | Y | — | 2.0 | — |
| Example 25 | SR8335 | GPO3A | Y | — | 2.0 | — |
| Example 26 | SR8335 | GPO3A | Y | — | 2.0 | — |
| Example 27 | SR8335 | GPO3A | Y | — | 2.0 | — |
| Example 28 | SR8335 | GPO3A | Y | — | 2.0 | — |
| Example 29 | SR8335 | GPO3A | Y | — | 2.0 | — |
| Example 30 | SR8335 | GPO3A | Y | — | 2.0 | — |
| Example 31 | SR8335 | GPO3A | Y | — | 2.0 | — |

| | Evaluation results | | | | | |
|---|---|---|---|---|---|---|
| | Rub fastness | | | Adhesiveness | Preservation stability | Ejection performance |
| | Dry | Water | IPA | | | |
| Example 1 | B | C | C | B | A | A |
| Example 2 | B | B | C | B | A | A |
| Example 3 | B | B | B | B | A | A |

TABLE 1-2-continued

| | | | | | | |
|---|---|---|---|---|---|---|
| Example 4 | B | B | B | B | A | A |
| Example 5 | B | B | B | B | A | A |
| Example 6 | A | B | B | B | A | A |
| Example 7 | A | B | B | B | A | A |
| Example 8 | B | B | B | B | A | A |
| Example 9 | A | B | B | B | A | A |
| Example 10 | A | B | B | B | A | A |
| Example 11 | A | B | B | B | A | A |
| Example 12 | B | B | B | B | A | A |
| Example 13 | B | B | C | B | A | A |
| Example 14 | B | B | C | B | A | A |
| Example 15 | A | B | B | B | A | A |
| Example 16 | A | B | B | B | A | A |
| Example 17 | A | B | B | A | A | A |
| Example 18 | A | A | B | A | A | A |
| Example 19 | A | A | B | A | A | A |
| Example 20 | A | A | B | A | A | A |
| Example 21 | A | A | B | A | A | A |
| Example 22 | A | A | B | A | A | A |
| Example 23 | A | A | B | A | A | A |
| Example 24 | A | A | A | A | A | A |
| Example 25 | A | A | A | A | A | A |
| Example 26 | A | A | A | A | A | A |
| Example 27 | A | A | A | A | A | A |
| Example 28 | A | A | A | A | A | A |
| Example 29 | A | A | A | A | A | A |
| Example 30 | A | A | A | A | A | A |
| Example 31 | A | A | A | A | A | A |

TABLE 2-1

Specified particles or Comparative particles
Polymer P or Comparative polymer

| | NCO | | | Polysiloxane | | | | Fluorinated hydrocarbon | | | |
|---|---|---|---|---|---|---|---|---|---|---|---|
| | Hydrophilic group | (for forming bond U) | Diol | Type | Mn | Amount (mass %) | Monovalent or divalent | Type | Amount (mass %) | Polymerizable group | Mw |
| Example 32 | DMPA | HMDI | (8) | Si-3 | 11000 | 5.0 | Monovalent | — | — | (26) | 4000 |
| Example 33 | DMPA | HMDI | (8) | Si-3 | 11000 | 5.0 | Monovalent | — | — | (26) | 10000 |
| Example 34 | DMPA | HMDI | (8) | Si-3 | 11000 | 5.0 | Monovalent | — | — | (26) | 30000 |
| Example 35 | DMPA | HMDI | (8) | Si-3 | 11000 | 5.0 | Monovalent | — | — | (26) | 80000 |
| Example 36 | DMPA | HMDI | (8) | Si-3 | 11000 | 5.0 | Monovalent | — | — | (26) | 150000 |
| Example 37 | DMPA | HMDI | (8) | Si-3 | 11000 | 5.0 | Monovalent | — | — | (26) | 15000 |
| Example 38 | DMPA | HMDI | (8) | Si-3 | 11000 | 5.0 | Monovalent | — | — | (26) | 15000 |
| Example 39 | DMPA | HMDI | (8) | Si-3 | 11000 | 5.0 | Monovalent | — | — | (26) | 15000 |
| Example 40 | DMPA | HMDI | (24) | — | — | — | — | — | — | (26) | 15000 |
| Example 41 | DMPA | HMDI | (24) | — | — | — | — | — | — | (26) | 15000 |
| Example 42 | DSO | HMDI | (18) | Si-3 | 11000 | 5.0 | Monovalent | — | — | (26) | 15000 |
| Example 43 | DSO | HMDI | (24) | Si-3 | 11000 | 5.0 | Monovalent | — | — | (26) | 15000 |
| Comparative Example 1 | MAA | — (using MMA) | | Si-b | 10000 | 5.0 | Monovalent | — | — | — | 15000 |
| Comparative Example 2 | DMPA | HMDI | (24) | — | — | — | — | — | — | (26) | 15000 |
| Comparative Example 3 | DMPA | HMDI | (24) | — | — | — | — | — | — | (26) | 15000 |
| Comparative Example 4 | DMPA | HMDI | (8) | Si-3 | 11000 | 5.0 | Monovalent | — | — | (26) | 15000 |
| Comparative Example 5 | DMPA | HDI | (18) | Si-3 | 11000 | 5.0 | Monovalent | — | — | (26) | 15000 |
| Comparative Example 6 | DMPA | HDI | (24) | Si-3 | 11000 | 5.0 | Monovalent | — | — | (26) | 15000 |

TABLE 2-2

| | Specified particles or Comparative particles | | | | |
|---|---|---|---|---|---|
| | Photo-polymerizable monomer | Photo-polymerizable monomer | Photo-polymerization initiator + sensitizer | Internally added polysiloxane compound (S) | Polysiloxane amount in particles (mass %) |
| Example 32 | SR8335 | GPO3A | Y | — | 2.0 |
| Example 33 | SR8335 | GPO3A | Y | — | 2.0 |
| Example 34 | SR8335 | GPO3A | Y | — | 2.0 |
| Example 35 | SR8335 | GPO3A | Y | — | 2.0 |
| Example 36 | SR8335 | GPO3A | Y | — | 2.0 |
| Example 37 | SR8335 | GPO3A | Y | Si-a | 12.0 |
| Example 38 | SR8335 | GPO3A | Y | Si-d | 12.0 |
| Example 39 | SR8335 | GPO3A | Y | Si-f | 12.0 |
| Example 40 | SR8335 | GPO3A | Y | Si-a | 10.0 |
| Example 41 | SR8335 | GPO3A | Y | Si-d | 10.0 |
| Example 42 | SR8335 | GPO3A | Y | — | 2.0 |
| Example 43 | SR8335 | GPO3A | Y | — | 2.0 |
| Comparative Example 1 | SR8335 | GPO3A | Y | — | 2.0 |
| Comparative Example 2 | SR8335 | GPO3A | Y | — | 0 |
| Comparative Example 3 | SR8335 | GPO3A | Y | — | 0 |
| Comparative Example 4 | — | — | — | — | 5.0 |
| Comparative Example 5 | — | — | — | — | 5.0 |
| Comparative Example 6 | — | — | — | — | 5.0 |

| | Externally added polysiloxane compound | Evaluation results | | | | | |
|---|---|---|---|---|---|---|---|
| | | Rub fastness | | | | Preservation stability | Ejection performance |
| | | Dry | Water | IPA | Adhesiveness | | |
| Example 32 | — | B | B | B | A | A | A |
| Example 33 | — | A | A | A | A | A | A |
| Example 34 | — | A | A | A | A | A | A |
| Example 35 | — | A | A | A | A | A | A |
| Example 36 | — | A | A | A | A | B | B |
| Example 37 | — | A | A | A | A | A | A |
| Example 38 | — | A | A | A | A | A | A |
| Example 39 | — | A | A | A | A | A | A |
| Example 40 | — | B | B | C | A | A | A |
| Example 41 | — | B | B | C | A | A | A |
| Example 42 | — | A | A | A | A | A | A |
| Example 43 | — | A | A | A | A | A | A |
| Comparative Example 1 | — | D | D | D | A | C | C |
| Comparative Example 2 | — | D | D | D | A | A | A |
| Comparative Example 3 | KP-109 | C | D | D | A | A | A |
| Comparative Example 4 | — | C | D | D | D | A | A |
| Comparative Example 5 | — | C | D | D | D | A | A |
| Comparative Example 6 | — | C | D | D | D | A | A |

As described in Table 1-1 to Table 2-2, for Examples each employing specified particles including the polymer P including the bond U being at least one species selected from the group consisting of a urethane bond and a urea bond and a hydrophilic group, a polymerizable monomer, and the moiety A being at least one species selected from the group consisting of a polysiloxane bond and a fluorinated hydrocarbon group, the cured films had high rub fastness and high adhesiveness.

Unlike Examples, for Comparative Example 1 employing the comparative polymer not including the bond U and Comparative Examples 2 and 3 employing the comparative particles not including the moiety A, the cured films had lowered rub fastness.

For Comparative Examples 4 to 6 employing the comparative particles not containing polymerizable monomers, the cured films had lowered rub fastness and lowered adhesiveness.

For example, compared with Comparative Example 3 in which the externally added polysiloxane compound (KP-109) was contained outside of the particles in the ink, for Examples 40 and 41 in which the internally added polysiloxane compound (S) was contained inside of the particles in the ink, the cured films had high rub fastness.

The reason for this is inferred as follows: in Examples 40 and 41, the particles contained both of the polymerizable monomer and the polysiloxane bond, so that cured films having both of hardness and surface lubricity were uniformly formed.

The results of Examples 28, 40, and 41 have demonstrated that the case where the polymer P includes the moiety A (Example 28) provides a cured film having further improved rub fastness.

The results of Examples 1 to 6 have demonstrated that the case where the polymer P includes a polysiloxane bond (Example 6) provides a cured film having further improved rub fastness.

The results of Examples 8 to 14 have demonstrated that the cases where the polysiloxane bond content relative to the total amount of the polymer P is 0.1 mass % to 25 mass % (Examples 9 to 12) provide cured films having further improved rub fastness.

The results of Examples 15 and 18 have demonstrated that the case where the polymer P includes a monovalent polysiloxane group (Example 18) provides a cured film having further improved rub fastness.

The results of Examples 32 and 33 have demonstrated that the case where the polymer P has a weight-average molecular weight of 5000 or more (Example 33) provides a cured film having further improved rub fastness.

The results of Examples 35 and 36 have demonstrated that the case where the polymer P has a weight-average molecular weight of 100000 or less (Example 35) provides an aqueous dispersion having further improved dispersion stability for the specified particles.

The results of Examples 19 and 24 have demonstrated that the case where the polymer P further includes a polymerizable group (Example 24) provides a cured film having further improved rub fastness.

For the above-described Examples 1 to 43, the aqueous dispersions of specified particles were individually used for measuring the volume-average dispersion particle sizes of the specified particles.

As a result, in each of Examples, the specified particles were found to have a volume-average dispersion particle size in the range of 100 nm to 200 nm.

Example 101: Thermosetting Ink

Preparation of Thermosetting Ink

The same procedures as in the preparation of the photocurable ink in Example 6 were performed except for the following points, to prepare a thermosetting ink.

Points Changed from Preparation of Photocurable Ink in Example 6

Compound (8) and Si-1 (Mn: 1000) used for synthesis of the polymer P were respectively changed to Compound (4) and Si-3 (Mn: 11000).

In the preparation of the aqueous dispersion of specified particles, the photopolymerizable monomer (SR833S (14.15 g) and GPO3A (14.15 g)), the photopolymerization initiator (IRGACURE (registered trademark) 819) (1.5 g), and the sensitizer (ITX) (0.25 g) were changed to "B7982" (30.05 g) serving as a thermal-polymerizable monomer.

"B7982" (molecular weight: 793) is Trixene™BI7982 from which propylene glycol monomethyl ether has been driven off at a reduced pressure under conditions of 60° C. and 2.67 kPa (20 torr).

Evaluations

The same evaluations were performed as in Example 1 except that the photocurable ink was replaced by the thermosetting ink, and the procedure of heat-drying the coating film at 60° C. for 3 minutes and irradiating the dried coating film with ultraviolet radiation (UV) was changed to a procedure of heating the coating film in an oven at 120° C. for 5 minutes.

The results will be described in Table 3-2.

Examples 102 to 104: Thermosetting Inks

The same procedures as in Example 101 were performed except that Compound (4) used for the synthesis of the polymer P was changed to compounds in Table 3-1 in an amount of the same mol % as in Compound (4). The amounts of the components were adjusted so as not to change the acid value (mmol/g) and a ratio [(Total number of moles of hydrophilic-group-introducing compound, polysiloxane-bond-introducing compound, and diol compound)/ Number of moles of isocyanate compound].

The results will be described in Table 3-2.

Example 105

The same procedures as in Example 104 were performed except that B7982 (30.05 g) was changed to a thermal-polymerizable monomer "E840" (27.05 g) and a thermosetting accelerator "2MI" (3.0 g).

The results will be described in Table 3-2.

"E840" is EPICLON™840 (thermal-polymerizable oligomer having epoxy group, DIC Corporation). "2MI" is 2-methylimidazole.

Comparative Example 101

The same procedures as in Example 105 were performed except that, in the synthesis of the polymer P, Si-3 (Mn:

11000) was not used by being replaced by Compound (24) in an amount of the same number of moles as in Si-3 (thus, Si-3 (Mn: 11000) was not used). The amounts of the components were adjusted so as not to change the acid value (mmol/g) and a ratio [(Total number of moles of hydrophilic-group-introducing compound, polysiloxane-bond-introducing compound, and diol compound)/Number of moles of isocyanate compound].

The results will be described in Table 3-2.

Hereinafter, the details will be described.

Preparation of Oil-Phase Component

TAKENATE (registered trademark) D-110N (22.87 g) manufactured by Mitsui Chemicals, Inc., as a hydrophilic-group-introducing compound, DMPA (1.85 g),

TABLE 3-1

| | Specified particles or Comparative particles Polymer P or Comparative polymer | | | | | | | |
|---|---|---|---|---|---|---|---|---|
| | | | | | | Polysiloxane | | |
| | Hydrophilic group | NCO (for forming bond U) | Diol | Type | Mn | Amount (mass %) | Monovalent or divalent | Mw |
| Example 101 | DMPA | HMDI | (4) | Si-3 | 11000 | 5.0 | Monovalent | 15000 |
| Example 102 | DMPA | HMDI | (18) | Si-3 | 11000 | 5.0 | Monovalent | 15000 |
| Example 103 | DMPA | HMDI | (23) | Si-3 | 11000 | 5.0 | Monovalent | 15000 |
| Example 104 | DMPA | HMDI | (24) | Si-3 | 11000 | 5.0 | Monovalent | 15000 |
| Example 105 | DMPA | HMDI | (24) | Si-3 | 11000 | 5.0 | Monovalent | 15000 |
| Comparative Example 101 | DMPA | HMDI | (24) | — | — | — | — | 15000 |

TABLE 3-2

| | Specified particles or Comparative particles | | | | | | | | |
|---|---|---|---|---|---|---|---|---|---|
| | Thermal- polymerizable monomer | Thermosetting accelerator | Polysiloxane amount in particles (mass %) | Rub fastness | | | Adhesive- ness | Preservation stability | Ejection performance |
| | | | | Dry | Water | IPA | | | |
| Example 101 | B7982 | — | 2.0 | A | A | A | A | A | A |
| Example 102 | B7982 | — | 2.0 | A | A | A | A | A | A |
| Example 103 | B7982 | — | 2.0 | A | A | A | A | A | A |
| Example 104 | B7982 | — | 2.0 | A | A | A | A | A | A |
| Example 105 | E840 | 2MI | 2.0 | A | A | A | A | A | A |
| Comparative Example 101 | E840 | 2MI | 0 | D | C | C | B | A | A |

As described in Tables 3-1 and 3-2, Examples 101 to 105 employing, as polymerizable monomers, thermal-polymerizable monomers also provide results similar to those in Examples 1 to 41 employing photopolymerizable monomers.

For the above-described Examples 101 to 105, the aqueous dispersions of specified particles were individually used for measuring the volume-average dispersion particle sizes of the specified particles.

As a result, in each of Examples, the specified particles were found to have a volume-average dispersion particle size in the range of 100 nm to 200 nm.

Example 201: Photocurable Ink Containing Specified Particles (MC)

Preparation of Aqueous Dispersion of Specified Particles (MC)

As the aqueous dispersion of specified particles, an aqueous dispersion of microcapsules (MC) including a shell formed of a polymer P being a crosslinked polymer, and a core including a photopolymerizable monomer, a photopolymerization initiator, and a sensitizer was prepared.

as a polysiloxane-bond-introducing compound, Si-1 (Mn: 10000) (manufactured by INC CORPORATION, SILAPLANE (registered trademark) FM-4425) (1.00 g), and NEOSTANN U-600 (0.02 g)

were mixed together, heated to 70° C., and stirred for 2 hours. The mixture was cooled to room temperature, subsequently mixed with as a photopolymerizable monomer, SR833S (14.15 g), as a photopolymerizable monomer, GPO3A (14.15 g), as a photopolymerization initiator, IRGACURE (registered trademark) 819 (1.5 g), as a sensitizer, ITX (isopropylthioxanthone) (0.25 g), and ethyl acetate (63.3 g), and stirred at room temperature for 30 minutes, to obtain an oil-phase component.

TAKENATE D-110N is a 75 mass % ethyl acetate solution of an adduct in which trimethylolpropane (TMP) and xylylene isocyanate (XDI) are joined in 1:3 (molar ratio) (adduct-type trifunctional isocyanate compound; hereafter, referred to as "D-110").

Preparation of Aqueous-Phase Component

Distilled water (140 g) and, as a neutralizer, sodium hydroxide were mixed together, and stirred for 15 minutes, to thereby prepare an aqueous-phase component.

The usage amount of sodium hydroxide serving as the neutralizer was adjusted such that, in the produced particles, the degree of neutralization became 90%.

Preparation of Aqueous Dispersion of Specified Particles (MC)

The oil-phase component and the aqueous-phase component were mixed together, and the resultant mixture was emulsified at room temperature using a homogenizer at 12000 rpm for 10 minutes, to obtain an emulsion.

The obtained emulsion was added to distilled water (60 g), and the resultant liquid was heated to 50° C., and stirred at 50° C. for 5 hours, to thereby drive off, from the liquid, ethyl acetate.

The liquid from which ethyl acetate had been driven off was diluted with distilled water so as to have a solid content of 20 mass %, to thereby obtain an aqueous dispersion of specified particles (MC).

The specified particles (MC) were found to have a volume-average dispersion particle size of 150 nm.

Preparation of Photocurable Ink

The components of a composition below were mixed together, to prepare a photocurable ink. This photocurable ink is also an example of the aqueous dispersion of specified particles.

Composition of Photocurable Ink

The above-described aqueous dispersion of specified particles (MC): 82 parts
Pigment dispersion liquid (Pro-jet Cyan APD1000 (manufactured by FUJIFILM Imaging Colorants), pigment concentration: 14 mass %): 13 parts
Fluorosurfactant (manufactured by E. I. du Pont de Nemours and Company, Capstone FS-31, solid content: 25 mass %): 0.3 parts
2-Methylpropanediol: 4.7 parts Evaluations The photocurable ink obtained above was evaluated as in Example 1.

The results will be described in Table 4-2.

Examples 202 to 203

The same procedures as in Example 201 were performed except that TAKENATE D-110N was changed to TAKENATE D-120N or TAKENATE D-170N (both are manufactured by Mitsui Chemicals, Inc.). The usage amount of TAKENATE D-120N or TAKENATE D-170N was adjusted such that the number of moles of the isocyanate compound became the same as the number of moles of the isocyanate compound in Example 201. In addition, the amounts of the components were adjusted so as not to change the acid value (mmol/g) and a ratio [(Total number of moles of hydrophilic-group-introducing compound and polysiloxane-bond-introducing compound)/Number of moles of isocyanate compound].

The results will be described in Table 4-2.

TAKENATE D-120N is a 75 mass % ethyl acetate solution of an adduct in which trimethylolpropane (TMP) and 1,3-bis(isocyanatomethyl)cyclohexane (HXDI) are joined in 1:3 (molar ratio) (adduct-type trifunctional isocyanate compound; hereafter, referred to as "D-120").

TAKENATE D-170N is hexamethylene diisocyanate isocyanurate (isocyanurate-type trifunctional isocyanate compound; hereafter, referred to as "D-170") (100 mass %).

Examples 204 to 206

The same procedures as in Examples 201 to 203 were performed except that Si-1 (Mn: 10000) was changed to Si-3 (Mn: 11000) in an amount of the same mass % as in Si-1. The amounts of the components were adjusted so as not to change the acid value (mmol/g) and a ratio [(Total number of moles of hydrophilic-group-introducing compound and polysiloxane-bond-introducing compound)/Number of moles of isocyanate compound].

The results will be described in Table 4-2.

Examples 207 to 209

The same procedures as in Example 205 were performed except for the following points.

The results will be described in Table 4-2.

Points Changed from Example 205

In the preparation of the oil-phase component, 5 g of the photopolymerizable monomer SR833S (14.15 g) was changed to an internally added polysiloxane compound (S) described in Table 4-2. As a result, the cores of the specified particles (MC) contained the internally added polysiloxane compound (S).

As the internally added polysiloxane compounds (S), Si-a, Si-d, and Si-f were the same as those used in Examples 37 to 39.

Example 210

The same procedures as in Example 204 were performed except that DMPA serving as the hydrophilic-group-introducing compound was changed to DSO. The amounts of the components were adjusted so as not to change the acid value (mmol/g) and a ratio [(Total number of moles of hydrophilic-group-introducing compound and polysiloxane-bond-introducing compound)/Number of moles of isocyanate compound].

The results will be described in Table 4-2.

Comparative Example 201

The same procedures as in Example 201 were performed except that, in the preparation of the oil-phase component, the hydrophilic-group-introducing compound (Si-1) (Mn: 10000) was replaced by DMPA in an amount of the same number of moles as in Si-1 (thus, (Si-1) (Mn: 10000) was not used).

The results will be described in Table 4-2.

Comparative Example 202

The same procedures as in Comparative Example 201 were performed except that, in the composition of the photocurable ink, 0.5 parts of the aqueous dispersion of Comparative particles (82 parts) was replaced by, as an externally added polysiloxane compound, KP-109 (silicone additive manufactured by Shin-Etsu Chemical Co., Ltd.). Thus, to the outside of the particles (MC) in the ink, KP-109 was externally added.

The results will be described in Table 4-2.

All the documents, patent applications, and technical standards mentioned in this Specification are incorporated herein by reference to the same extent as in the case where the documents, patent applications, and technical standards

TABLE 4-1

| | Specified particles (MC) or Comparative particles | | | | | | | |
|---|---|---|---|---|---|---|---|---|
| | Polymer P or Comparative polymer | | | | | | | |
| | | NCO | Polysiloxane | | | | | |
| | Hydrophilic group | (for forming bond U) | Type | Mn | Amount (mass %) | Monovalent or divalent | Photopolymerizable monomer | Photopolymerizable monomer |
| Example 201 | DMPA | D-110 | Si-1 | 10000 | 5.0 | Divalent | 5R8335 | GPO3A |
| Example 202 | DMPA | D-120 | Si-1 | 10000 | 5.0 | Divalent | 5R8335 | GPO3A |
| Example 203 | DMPA | D-170 | Si-1 | 10000 | 5.0 | Divalent | 5R8335 | GPO3A |
| Example 204 | DMPA | D-110 | Si-3 | 11000 | 5.0 | Monovalent | 5R8335 | GPO3A |
| Example 205 | DMPA | D-120 | Si-3 | 11000 | 5.0 | Monovalent | 5R8335 | GPO3A |
| Example 206 | DMPA | D-170 | Si-3 | 11000 | 5.0 | Monovalent | 5R8335 | GPO3A |
| Example 207 | DMPA | D-120 | Si-3 | 11000 | 5.0 | Monovalent | 5R8335 | GPO3A |
| Example 208 | DMPA | D-120 | Si-3 | 11000 | 5.0 | Monovalent | 5R8335 | GPO3A |
| Example 209 | DMPA | D-120 | Si-3 | 11000 | 5.0 | Monovalent | 5R8335 | GPO3A |
| Example 210 | DSO | D-110 | Si-3 | 11000 | 5.0 | Monovalent | 5R8335 | GPO3A |
| Comparative Example 201 | DMPA | D-110 | — | — | — | — | 5R8335 | GPO3A |
| Comparative Example 202 | DMPA | D-110 | — | — | — | — | 5R8335 | GPO3A |

TABLE 4-2

| | Specified particles (MC) or Comparative particles | | | | Evaluation results | | | | | |
|---|---|---|---|---|---|---|---|---|---|---|
| | Photopolymerization initiator + sensitizer | Internally added polysiloxane compound (S) | Polysiloxane amount in particles (mass %) | Externally added polysiloxane compound | Rub fastness | | | Adhesiveness | Preservation stability | Ejection peformance |
| | | | | | Dry | Water | IPA | | | |
| Example 201 | Y | — | 2.0 | — | A | B | B | A | A | A |
| Example 202 | Y | — | 2.0 | — | A | B | B | A | A | A |
| Example 203 | Y | — | 2.0 | — | A | B | B | A | A | A |
| Example 204 | Y | — | 2.0 | — | A | A | A | A | A | A |
| Example 205 | Y | — | 2.0 | — | A | A | A | A | A | A |
| Example 206 | Y | — | 2.0 | — | A | A | A | A | A | A |
| Example 207 | Y | Si-a | 12.0 | — | A | A | A | A | A | A |
| Example 208 | Y | Si-d | 12.0 | — | A | A | A | A | A | A |
| Example 209 | Y | Si-f | 12.0 | — | A | A | A | A | A | A |
| Example 210 | Y | — | 2.0 | — | A | A | A | A | A | A |
| Comparative Example 201 | Y | — | 0 | — | D | C | C | B | A | A |
| Comparative Example 202 | Y | — | 0 | KP-109 | C | C | C | B | A | A |

As described in Tables 4-1 and 4-2, Examples 201 to 210 employing, as the aqueous dispersions of specified particles, aqueous dispersions of microcapsules (MC) including a shell formed of a polymer P being a crosslinked polymer and a core including a photopolymerizable monomer, a photopolymerization initiator, and a sensitizer also provided advantages similar to those in Examples 1 to 43.

For the above-described Examples 201 to 210, the aqueous dispersions of specified particles (MC) were individually used for measuring the volume-average dispersion particle sizes of the specified particles (MC).

As a result, in each of Examples, the specified particles (MC) were found to have a volume-average dispersion particle size in the range of 100 nm to 200 nm.

The entire contents disclosed by JP2019-177414 filed in the Japan Patent Office on Sep. 27, 2019 are incorporated herein by reference.

are each specifically and individually described as being incorporated herein by reference.

What is claimed is:

1. A particle, comprising:
   a polymer P comprising a bond U that is at least one selected from the group consisting of a urethane bond and a urea bond, and a hydrophilic group;
   a polymerizable monomer; and
   a moiety A that is at least one selected from the group consisting of a polysiloxane bond and a fluorinated hydrocarbon group.

2. The particle according to claim 1, wherein the polymer P comprises the moiety A.

3. The particle according to claim 1, wherein the polymer P comprises a polysiloxane bond.

4. The particle according to claim 3, wherein a content of the polysiloxane bond relative to a total amount of the polymer P is 0.1 mass % to 25 mass %.

5. The particle according to claim 3, wherein the polymer P comprises a monovalent polysiloxane group constituted by a terminal group that is a hydrogen atom, an alkyl group having 1 to 18 carbon atoms, or a phenyl group, and a polysiloxane bond.

6. The particle according to claim 3, wherein the polymer P comprises a structural unit (P1), a structural unit (P2), and a structural unit (P3) below:

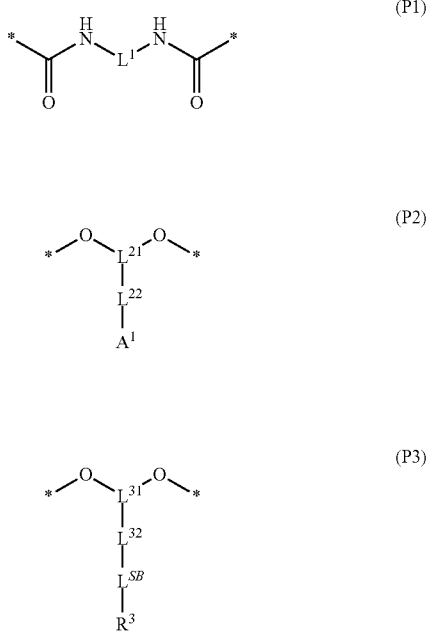

wherein, in the structural units (P1) to (P3), $L^1$ represents a divalent organic group having 1 to 20 carbon atoms, $L^{21}$ represents a trivalent organic group having 1 to 20 carbon atoms, $L^{22}$ represents a single bond or a divalent organic group having 1 to 20 carbon atoms, $A^1$ represents a carboxy group, a salt of a carboxy group, a sulfo group, or a salt of a sulfo group, $L^{31}$ represents a trivalent organic group having 1 to 20 carbon atoms, $L^{32}$ represents a single bond or a divalent organic group having 1 to 20 carbon atoms, $L^{SB}$ represents a polysiloxane bond, $R^3$ represents a hydrogen atom, an alkyl group having 1 to 18 carbon atoms, or a phenyl group, and

* represent bonding sites.

7. The particle according to claim 1, wherein the polymer P has a weight-average molecular weight of 5000 to 100,000.

8. The particle according to claim 1, wherein the polymer P further comprises a polymerizable group.

9. The particle according to claim 1, wherein a content of the polymerizable monomer relative to a total solid content of the particle is 10% by mass to 90% by mass.

10. An aqueous dispersion, comprising:
the particle according to claim 1; and
water.

11. An ink jet ink, comprising:
the particle according to claim 1; and
water.

12. A film-forming method, comprising:
applying the aqueous dispersion according to claim 10 onto a substrate; and
curing the aqueous dispersion applied onto the substrate.

13. An image-forming method, comprising:
applying the ink jet ink according to claim 11 onto a substrate by an ink jet process; and
curing the ink jet ink applied onto the substrate.

14. The particle according to claim 1, wherein the hydrophilic group comprises an anionic group selected from the group consisting of a carboxy group, a sulfo group, a sulfuric acid group, a phosphonic acid group, and a phosphoric acid group, or a nonionic group having a polyether structure.

* * * * *